(12) United States Patent
Mandt

(10) Patent No.: US 6,398,957 B1
(45) Date of Patent: Jun. 4, 2002

(54) SURGE ANOXIC MIX SEQUENCING BATCH REACTOR SYSTEMS

(76) Inventor: Mikkel G. Mandt, 550 W. Flamingo Dr., Venice, FL (US) 34185

( * ) Notice: Subject to any disclaimer, the term of this patent is extended or adjusted under 35 U.S.C. 154(b) by 0 days.

(21) Appl. No.: 09/297,729

(22) PCT Filed: Mar. 3, 1999

(86) PCT No.: PCT/US99/04744

§ 371 Date: Dec. 2, 1999

(87) PCT Pub. No.: WO99/44951

PCT Pub. Date: Sep. 10, 1999

Related U.S. Application Data

(63) Continuation-in-part of application No. 09/034,512, filed on Mar. 4, 1998.
(60) Provisional application No. 60/102,864, filed on Oct. 2, 1998.

(51) Int. Cl.[7] .............................. C02F 3/30; C02F 11/02

(52) U.S. Cl. ................... 210/605; 210/622; 210/629; 210/195.1; 210/220; 210/258; 210/532.1

(58) Field of Search ................................ 210/603, 605, 210/621, 622, 623, 512, 629, 630, 195.1, 205, 220, 258, 523, 525, 532.1; 261/77, 121.1

(56) References Cited

U.S. PATENT DOCUMENTS

| | | | | |
|---|---|---|---|---|
| 4,056,465 A | * | 11/1977 | Spector |
| 4,271,026 A | * | 6/1981 | Chen et al. |
| 4,536,286 A | * | 8/1985 | Nugent |
| 4,693,827 A | * | 9/1987 | Mordorski |
| 4,915,841 A | * | 4/1990 | Lagana' et al. |
| 5,013,441 A | * | 5/1991 | Goronszy |
| 5,182,021 A | * | 1/1993 | Spector |
| 5,192,442 A | * | 3/1993 | Piccirillo et al. |
| 5,205,936 A | * | 4/1993 | Topnik |
| 5,228,996 A | * | 7/1993 | Lansdell |
| 5,395,527 A | * | 3/1995 | Desjardins |
| 5,409,613 A | * | 4/1995 | Weaver |
| 5,601,719 A | * | 2/1997 | Hawkins et al. |
| 5,626,755 A | * | 5/1997 | Keyser et al. |
| 5,667,688 A | * | 9/1997 | Kerrn-Jespersen et al. |
| 5,688,400 A | * | 11/1997 | Baxter, Sr. |
| 5,744,037 A | * | 4/1998 | Fujimura et al. |
| 6,190,554 B1 | * | 2/2001 | Mandt |

* cited by examiner

Primary Examiner—David A. Simmons
Assistant Examiner—Fred Prince
(74) Attorney, Agent, or Firm—Welsh & Katz, Ltd.

(57) ABSTRACT

Wastewater treatment systems which utilize an interacting surge anoxic mix zone for facilitating nitrogen removal and an aerobic sequential batch reaction, clarification and decantation zone for facilitating aeration for BOD removal and nitrate production for the surge anoxic mix zone. Sludge reduction may also be accomplished by anaerobic recycle.

13 Claims, 17 Drawing Sheets

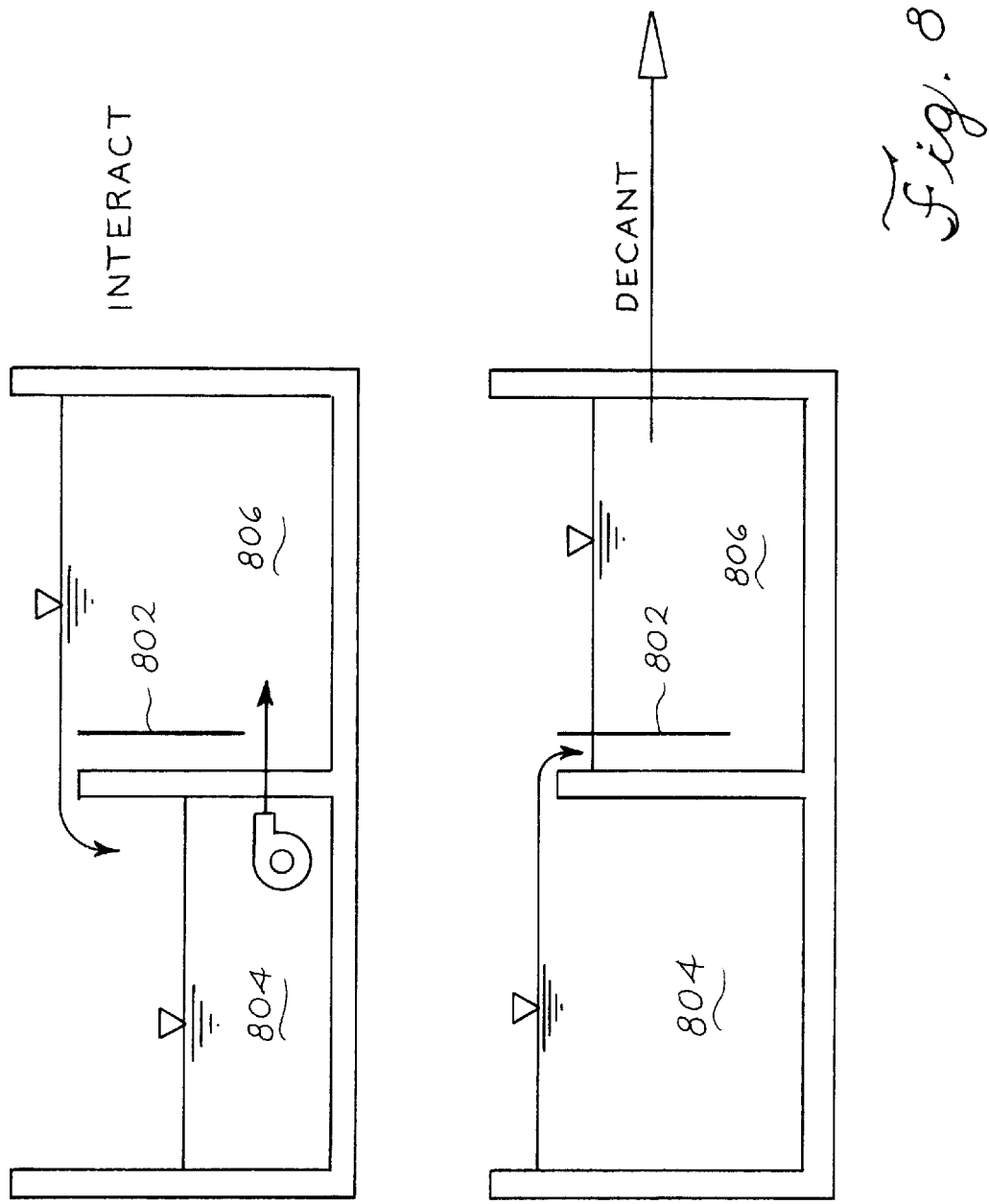

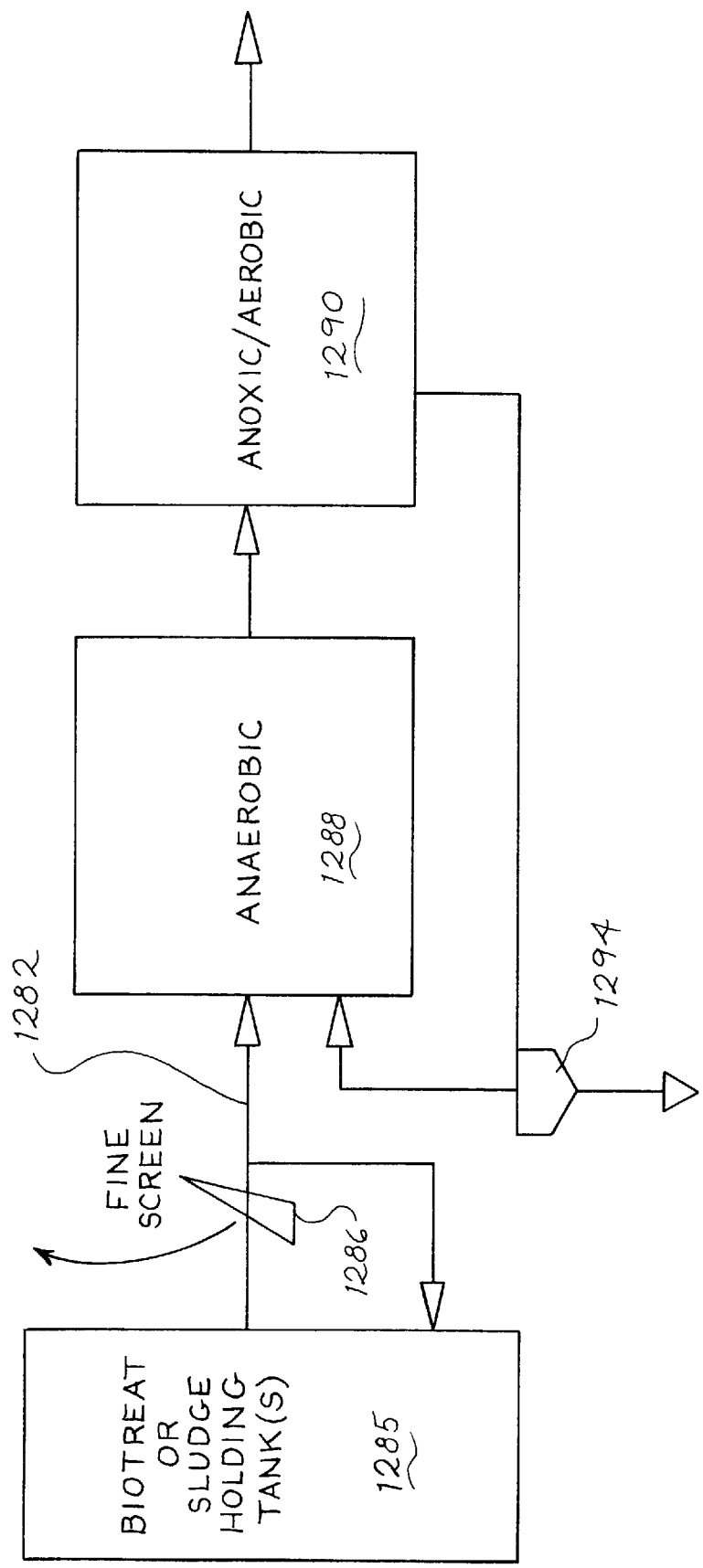

SURGE ANOXIC MIX SEQUENCING BATCH REACTOR SYSTEMS

CROSS REFERENCE TO RELATED APPLICATIONS

This application is a continuation-in-part of application Ser. No. 09/034,512 filed Mar. 4, 1998, and claims priority of provisional application No. 60/102,864 filed Oct. 2, 1998 and PCT Application PCT/US99/04744 filed Mar. 3, 1999 which are incorporated herein by reference.

FIELD OF THE INVENTION

The present invention is directed to methods and apparatus for wastewater treatment, and more particularly, is directed to sequential batch reaction methods and apparatus for wastewater treatment.

BACKGROUND OF THE INVENTION

Wastewater treatment and treated effluent goals and standards have become increasingly stringent for the economical removal of wastewater components such as total suspended solids (TSS), biological oxygen demand (BOD), nitrogen (as nitrate and ammonia) and phosphorous from large volumes of municipal and industrial wastewater. Activated sludge systems of either the continuous flow type in which an influent stream is continuously treated and continuously discharged through one or more treatment zones, or the sequencing batch reactor type in which a continuous influent stream is sequentially treated and intermittently discharged, are conventionally used for wastewater treatment. In such activated sludge treatment systems, treatment microorganisms are concentrated in the treatment system in order to more rapidly remove the wastewater impurities, including BOD, nitrogenous, and phosphorous components of the wastewater. The highly diverse, mixed cultures utilized in such activated sludge wastewater treatment systems for biological removal of BOD, nitrogen and phosphorous include ordinary heterotrophs (which can consume organic wastewater components to produce carbon dioxide and reduce BOD, as well as mediate denitrification), autotrophs (which mediate nitrification in consuming nitrogenous wastewater components) and phosphotrophs (which can accumulate polyphosphates in consuming phosphorous-containing wastewater components).

The various types of microorganisms in activated sludge cultures typically utilize different nutrient, oxygenation and other conditions for optimum removal of different wastewater components. The organic materials in the wastewater are consumed by "activated sludge" microorganisms for both energy and cell synthesis, driven by biological oxidation-reduction reactions involving transfer of electrons from a wastewater component to be oxidized (the electron donor) to an oxidizing material (the electron acceptor). Heterotrophic metabolism utilizes organic wastewater components as electron donors, while autotrophic metabolism utilizes inorganic wastewater components as electron donors. In aerobic systems in which the wastewater is aerated, oxygen is utilized by "activated sludge" microorganisms as the terminal electron acceptor. In anoxic systems, the oxygen is substantially depleted, and "activated sludge" microorganisms utilize nitrates and nitrites as the primary terminal electron acceptors. Under anaerobic conditions, oxygen, nitrate and nitrite components are substantially depleted, and carbonates and sulfates serve as primary terminal electron acceptors in the cell reactions (M. G. Mandt and B. A. Bell "Oxidation Ditches", 169 pgs., 1982, Ann Arbor Science Publishers). It should be noted that different microorganisms and/or metabolic pathways may predominate under such different aerobic, anoxic and anaerobic conditions.

Sequencing batch reactors such as described in U.S. Pat. No. 4,596,658 to Mandt, are conventionally utilized for wastewater treatment to provide high quality effluent by subjecting a given volume of wastewater to a predetermined sequence of different treatment steps in batch mode, in the same batch reactor equipment. In this regard, a volume of waste water may typically be introduced as a continuous or discontinuous feed stream into a sequencing batch reactor treatment system and subjected to extensive mixing and aeration for a predetermined period of time to provide biological oxidation, consumption or other removal of wastewater components. The mixing and aeration may subsequently be stopped and the wastewater maintained in a quiescent state in the same treatment zone to permit wastewater solids, including microbiological treatment organisms, to settle in the reactor. A clarified portion of the treated wastewater may be subsequently removed from the upper portion of the reactor, which in turn may be conducted to subsequent treatment and discharge steps. Additional wastewater which is to be treated may then be introduced into the sequencing batch reactor, and the cycle repeated. For many wastewater treatment applications, sequencing batch reactors may provide a number of advantages over older type continuous flow treatment systems in terms of expense, physical area and operating energy requirements. However, although sequencing batch reactors have proven to be efficient, flexible and economic wastewater treatment systems, further improvements which could increase the processing efficiency, and/or optimize treatment conditions, such as anoxic and aerobic treatment conditions, for wastewater component removal would be desirable. Such improved sequencing batch reactor methods and apparatus would be desirable which would be simple and effective in operation, which would permit enhancement and synergistic interaction of anoxic and aerobic treatment conditions for assisting wastewater component removal, and which would enhance the utility and cost effectiveness of sequencing batch reactors for wastewater treatment.

Accordingly, it is an object of the present invention to provide such improved methods and apparatus and sequencing batch reactor systems which utilize such methods and apparatus.

In many biological treatment plants treating municipal wastewater, approximately 1 to 2% of the influent by volume exits the treatment process as dilute waste sludge (WAS) requiring further treatment and/or disposal. The further treatment and disposal of this 1 to 2% dilute waste sludge may represent a significant part (e.g., up to 50%) of the total cost of wastewater treatment in a modern treatment plant. In addition to the capital costs for tankage and equipment for sludge reduction, dewatering, hauling, and ultimate disposal, there are significant continuing operating costs for power, treatment chemicals, hauling and landfill fees. The continuing operating costs for sludge reduction, dewatering, hauling and ultimate sludge disposal may even constitute the most substantial portion of the cost in municipal wastewater operating budgets. Furthermore, these costs have tended to increase in recent years with increasing public and political opposition to hauling and disposal of sludge in many localities, thereby limiting disposal sites and capacities.

Many conventional municipal wastewater treatment plants process waste sludge by using anaerobic or aerobic digestion for pathogen and organic sludge reduction in the waste sludge produced by suspended growth biological wastewater treatment systems, such as the various continuous flow activated sludge systems, sequencing batch reactor systems, and fixed growth biological systems including trickling filters or rotating biological contactors. Regardless of the source, the waste sludge (WAS) is typically dilute, generally less than 1–2% solids content by weight. The total suspended solids (TSS) contained in such sludge consists of organic or volatile suspended solids (VSS) and inorganic, inert or fixed suspended solids (FSS). The organic fraction is typically about 70% of the total suspended solids and comprises microorganisms, cellulose, bits and pieces of plastic, and other insoluble organic compounds. Depending on influent constituents and the type of biotreatment system used to treat the sewage, VSS will typically range from about 60% to 90% of TSS. Most larger wastewater treatment plants, and substantially all small and medium size wastewater treatment plants, use aerobic sludge digestion rather than the more complex anaerobic digestion. In aerobic digestion, the waste sludge is held in a tank or tanks where it is repetitively aerated and thickened by gravity settling and decanting of supernatant. The supernatant may be recycled to the sewage processing biotreatment plant. The remaining digested sludge is highly hydroscopic, and as a practical limit generally cannot readily be thickened beyond 2–3% by weight solids concentration.

The United States Environmental Protection Agency (the EPA) recommends that the waste sludge be held and aerated long enough to destroy 38% of the VSS conetnt in order to reduce pathogens and odor potential of the sludge) and to produce a more stable sludge which is suitable for liquid hauling and land disposal or further dewatering and processing. Dewatering may be accomplished by chemical treatment using relatively large doses of expensive, synthetic polymers to counteract the hydroscopic nature of the sludge, agglomerate the solids and allow further water separation. Horizontal, solid-bowl centrifuges or belt filter presses are typically used to mechanically separate water from the polymer-treated sludge, increasing solids content of the sludge to typically 15 to 25% by weight. At this point, the sludge is truckable and can be hauled to a landfill. Alternatively, sludge drying and incineration or composting have been used to further process the sludge to reduce its volume.

Achieving the U.S. EPA-recommended 38% reduction of VSS by aerobic digestion typically requires considerable tankage, as well as extended aeration contact or retention time. Tankage requirements may be, for example, about 25% to 50% of the tankage volume for the main sewage treatment system. In this regard, a plant treating 1 million gallons per day (MGD) of municipal sewage containing 200 mg/l of BOD5 and 200 mg/g TSS in the influent may produce about 1700 pounds per day of waste sludge. If the sludge is removed or "wasted" at 1% solids content, roughly 20,000 gallons per day (gpd) of waste sludge must be wasted from the treatment plant, which amounts to approximately 2% of the influent flow. Assuming 30 days sludge holding time is required for the aerobic digestion of the sludge to insure removal of at least 38% of the sludge VSS, the required aerobic digestion tankage of 600,000 gallons may approach or equal the tankage requirements for the actual sewage treatment. Some states such as Iowa, which prohibit land application in winter when the ground is frozen, require 180 days of sludge storage, which significantly increases the tankage requirements. In this example, of the 1700 pounds per day of sludge requiring aerobic digestion, roughly 70%, or 1190 pounds, may be organic (VSS), leaving 510 pounds of inorganics or biologically inert materials which cannot be biologically oxidized. If 38% of the VSS is consumed or destroyed, there will still be roughly 738 pounds of VSS in the sludge. The digested sludge at that point will be roughly 60% organic and 40% inorganic. Sludge is digested and consumed (destroyed) by biological oxidation of organics and auto oxidation of microbial biomass. If digested sludge leaves the digester at 1.5% solids content, roughly 10,000 gallons per day, or 1% of the influent wastewater to the treatment plant, must be wet hauled to land disposal or sent to further processing. Accordingly, it is an objective of some embodiments of the present disclosure to provide treatment systems which can substantially reduce the amount of sludge which must be disposed of by landfill or further processing.

Other objectives of various optional embodiments of the present disclosure are to provide treatment systems and processes which contain surface scum and quiescently transfer wastewater, and/or which are capable of reducing the total amount of sludge for disposal from about 1% or more to less than 0.011% by volume of influent wastewater to be treated. A further objective of such embodiments is to produce a stable, relatively inert byproduct having improved, "less sludge-like" characteristics for ultimate disposal on site or in local landfills.

These and other objects of the disclosure (which may each be independent of other objectives in different embodiments of the invention, or may be combined with other objectives, particularly in preferred embodiments), will become more apparent from the following detailed description and the accompanying drawings.

DESCRIPTION OF THE DRAWINGS

FIG. 8 is a cross-sectional side view of an embodiment of an improved surface skimming and intertank flow baffling and diffusion device for wastewater treatment systems, such as the surge anoxic mix systems illustrated in FIGS. 1–7;

FIGS. 12C and 12D represent independent sludge reduction systems, utilizing anaerobic recycling pretreatment, and including such sludge reduction systems with inorganic content removal;

SUMMARY OF THE INVENTION

Figure 1:
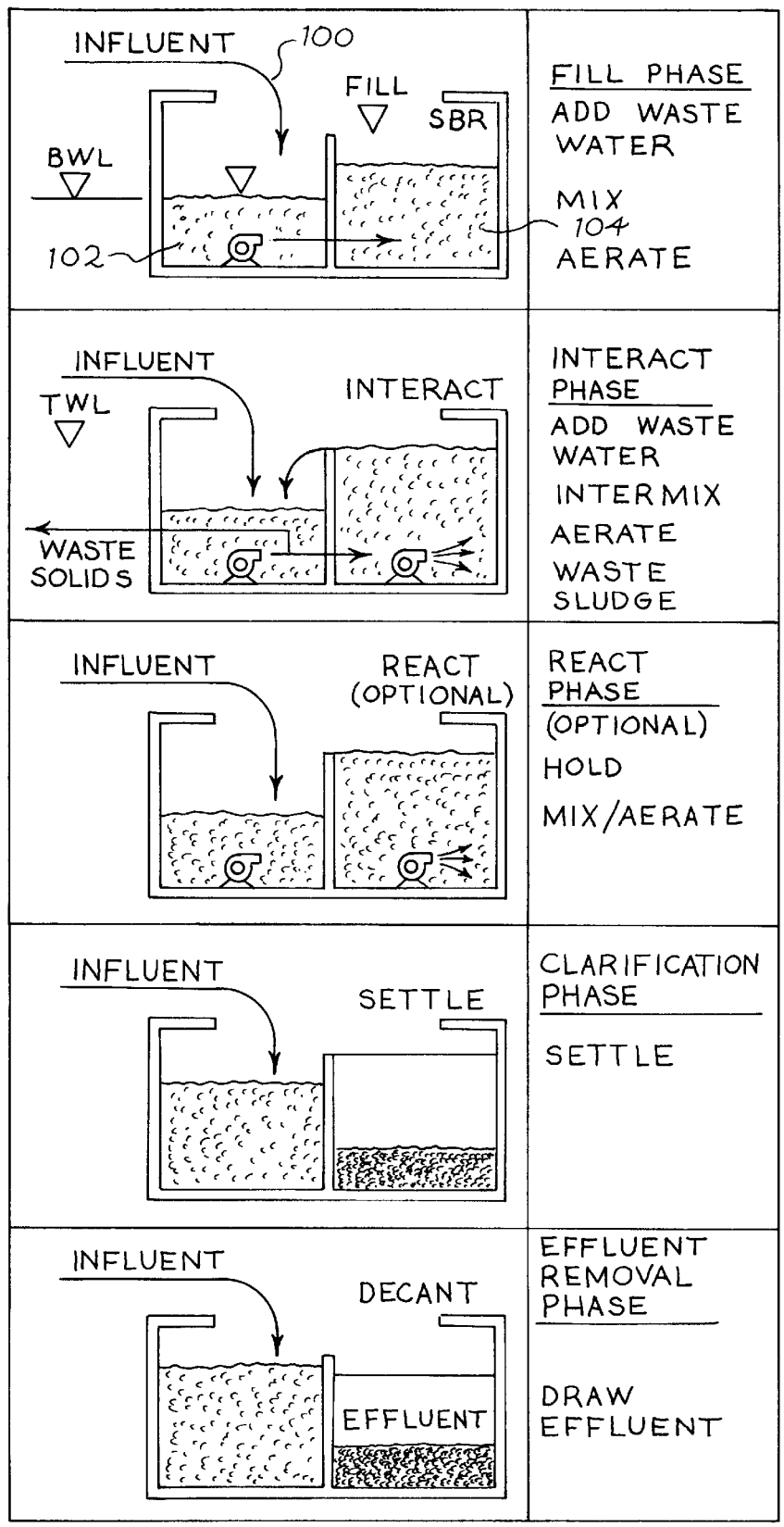
FIG. 1 is a schematic process flow diagram of an embodiment of a surge anoxic mix, sequencing batch reaction process in accordance with the present invention in which wastewater is treated in interacting anoxic and aerated batch treatment zones.

Generally in accordance with the present invention, sequencing batch reaction wastewater treatment methods and apparatus are provided which utilize interacting anoxic mix and sequencing batch aerobic reaction zones for treating wastewater to reduce its solids content, biological oxygen demand and nitrogenous content, through the use of separate, sequentially interacting anoxic and aerobic treatment zones. In accordance with such methods, influent wastewater to be treated may be introduced into an anoxic waste liquid treatment zone containing waste solids including treatment microorganisms. Typically, the overall cycle time for carrying out the sequential processing step of the treatment cycle will be less than 20 hours, and preferably less than 15 hours, although the cycle time will vary depending on factors including temperature and type and concentration of impurities to be treated. The influent wastewater may typically be municipal or industrial wastewater which may contain various types of impurities such as ammonia, organic nitrogen, nitrates, nitrites, soluble and insoluble hydrocarbons, cellulose fibers, settleable and colloidal solids and other organic materials, inorganic solids or grit, fats, oils, grease and phosphates, as well as a variety of other impurities. The wastewater may be introduced directly into the anoxic treatment zone, but also may be pretreated by filtering, screening, degritting, primary clarification, and/or passage through an anaerobic treatment or retention zone, such as a "trash trap" solids collection chamber before introduction into the anoxic treatment zone. Benefits of recycling anaerobic pretreatment will be further described after describing surge anoxic mix treatment.

In accordance with various aspects of the present invention, wastewater and treatment microorganisms from the anoxic waste liquid treatment zone are introduced into an aerobic sequencing batch reactor (SBR) aeration treatment zone containing waste solids including treatment microorganisms which is preferably maintained for at least the major portion of the treatment cycle under aerobic conditions. The waste liquid in the aerobic sequencing batch aeration treatment zone is mixed and aerated during an aeration treatment cycle time to reduce the biological oxygen demand of the wastewater and to convert at least a portion of the nitrogenous wastewater components to inorganic nitrate or nitrite components. As indicated, wastewater is preferably maintained under aerobic conditions in the aeration treatment zone for at least half of the overall treatment cycle time, although less aeration time may be required for certain types of influent wastewater, such as wastewater with relatively high nitrate content. It is an important aspect of the methods that waste liquid and treatment microorganisms from the sequencing batch aeration zone are also introduced into and mixed in the anoxic mix treatment zone, to provide nitrate or nitrite oxidizing components for the anoxic treatment microorganism metabolism and to convert the nitrate or nitrite components to nitrogen for removal from the wastewater in the anoxic treatment zone. Subsequently, the waste liquid in the aerated treatment zone is maintained in a quiescent state for a settling period to form a clarified upper layer, and a stratified lower layer containing waste solids including treatment microorganisms. A portion of the clarified upper layer of treated effluent may be removed, preferably by decantation from the sequencing aeration treatment zone. The decanted clarified liquid is a high quality treated effluent. The influent wastewater to be treated is generally produced on a continuous basis, the flow rate of which may vary at different times of the day with additional weekly, seasonal and other variations. The influent wastewater is accordingly introduced into the anoxic waste liquid treatment zone, which serves to at least partially buffer the influent flow during the treatment cycle of the sequencing batch reactor system. Influent flows are frequently continuous, although they may vary in flow rate. Influent flow may also be discontinuous (interrupted) but will usually be continual, requiring ready treatment capacity. It is an advantage of surge anoxic mix systems that continuous and continual influent flows may be readily accommodated. The ratio of the volume of the anoxic waste liquid treatment zone to the volume of the aerobic sequential batch treatment zone is related to the flow buffering or equalization function of the anoxic mix zone, and the relative ratio of nitrogen to BOD components in the wastewater. Typically, the volume ratio of the anoxic mix treatment zone to the aerobic batch treatment zone or zones which it feeds and interacts with will be in the range of from about 0.2 to about 1.0, and preferably from about 0.3 to about 0.7. For municipal wastewater, the surge anoxic mix treatment zone will typically be about one half of the volume of the aerated sequencing batch treatment zone, although for high nitrogen (e.g., concentration of 40 mg/l) industrial or municipal wastewater, the volume of the anoxic treatment zone may be about the same as that of the aerobic sequencing batch treatment zones in order to appropriately process the nitrogen removal. As indicated, the interaction of waste liquid between the aeration treatment zone and the anoxic mix zone is important. The interaction should be sufficiently rapid to be effective, but should not be so rapid that the respective anoxic and aerobic optimized reaction gradients in the respective zones are not maintained. The introduction of wastewater and treatment microorganisms from the anoxic waste liquid treatment zone to the aerobic sequencing batch treatment zone and the introduction of wastewater and treatment microorganisms from the sequencing batch aeration zone to the anoxic mix treatment zone are each desirably carried out during this interaction, at a rate of at least about 20 percent, and preferably at least about 50 percent of the total volume of the aerobic treatment zone, per hour. The interaction of the waste liquid in the aerobic treatment zone is continued until a desired level of BOD and nitrogen reduction is achieved. Following the interaction phase, the wastewater in the aerobic treatment zone is maintained in a quiescent condition to clarify an upper layer of the wastewater, and a portion of the clarified upper layer is discharged from the treatment zone as treated waste water. The sequential batch treatment cycle is subsequently repeated.

Particularly preferred embodiments of the present method utilize a repetitive sequence of the following steps:

a fill step in which the influent waste water is introduced into the anoxic mix zone and pumped from the anoxic mix zone into the aerobic sequencing batch aeration treatment zone until a predetermined upper liquid level is reached in the aerobic sequencing batch reaction zone;

an interaction step in which the waste liquid is aerated or mixed in the aerobic sequencing batch aeration treatment zone while liquid from the aerobic zone containing nitrate or nitrite components is introduced into the anoxic mix zone, and anoxic waste liquid from the anoxic zone is introduced into the aerobic zone. Preferably, this introduction of liquid from the aeration treatment zone into the anoxic mix zone, and of liquid from the anoxic mix zone into the aerobic treatment zone are each carried out at a rate of at least 0.2 times the volume of liquid in the anoxic mix zone per hour, and more preferably, at a rate in the range of from about 50 to about 500 percent of the total volume of waste liquid in the aerobic treatment zone, per hour, during the interaction step.

a settling step in which influent wastewater is introduced into the anoxic treatment zone while the waste liquid in the aerobic zone is maintained in a quiescent condition without substantial mixing, aeration or introduction of wastewater from the anoxic zone, to provide an upper zone of clarified wastewater, and a decantation step in which clarified effluent is withdrawn from the clarified upper zone of the aerobic treatment zone.

The cycle times for the individual steps and the overall batch process cycle time will depend on a variety of system design parameters, as well as the wastewater impurity loading, the water temperature and similar factors. The initiation of each step, and the conclusion of a preceding step may be controlled in any suitable manner, such as on a timed basis, or may be triggered by various water level conditions in the treatment system. The timing of the sequential processing steps may also be controlled by appropriate sensors such as oxygen and nitrate sensors. The total treatment cycle may typically take from about 2 to about 12 hours, but may be longer, for example, under cold weather or high organic or nitrogen loading conditions. The fill step is typically carried out for about 10% to about 30% of the nit total treatment cycle time, which may typically be from about 6 minutes or 0.1 hours to about 60 minutes or 1 hour, for a system having a hydraulic retention time of from about 16 to about 20 hours. The interaction step is typically carried out for about 25% to about 75% of the total treatment cycle time, which may typically be from about 0.1 hours to about 2 hours, for a system having a hydraulic retention time of from about 16 to about 20 hours. The settling step is typically carried out for about 10% to about 30% of the total treatment cycle time, which may typically be from about to about 0.5 to 1 hours, for a system having a hydraulic retention time of from about 16 to about 20 hours. The decantation step is typically carried out for about 5% to about 25% of the total treatment cycle time, which may typically be from about to about 0.1 to 1 hours, for a system having a hydraulic retention time of about 16–20 hours.

The methods may further include a separate aeration and/or mixing reaction step after the interaction step and before the settling step, in which the influent is introduced into the anoxic mixing zone, and the wastewater in the aerobic treatment zone is mixed and aerated without introduction of wastewater from the anoxic mix zone into the aerobic treatment zone. The optional separate aeration and/or mixing step may typically be carried out from about 0 to about 12 hours, preferably from about 0.1 to about 3 hours, or until the BOD is reduced to a predetermined value such as less than 20 mg/l.

In such treatment methods, the wastewater solids, particularly including the microbiological treatment organisms which grow in the wastewater may be periodically removed from the treatment system. In this regard, a portion of wastewater solids may desirably be removed from the aerobic treatment zone during or after decantation of clarified effluent, and before completion of the filling step. The wastewater containing wastewater microorganisms and other solids may be pumped to conventional solids separation, digestion or disposal apparatus in accordance with conventional practice. However, a portion of the wastewater containing such solids may also be introduced into an anaerobic digestion zone, such as an anaerobic "trash trap" for subsequent reintroduction into the anoxic mix zone. In this manner, the total solids produced by the treatment system may be significantly reduced, by anaerobic digestion of the waste solids. In addition, the removal of phosphorous may be facilitated. In this regard, when mixed liquor microorganisms are subjected to anaerobic conditions, the cells tend to give up phosphorous and ammonia back into solution, to create a more phosphorous and nitrogen-rich influent stream. When the surviving microorganisms are subsequently subjected to an anoxic or aerobic environment in the anoxic mix or aerobic sequencing batch reaction zones, they tend to take up more phosphorous than was given up, particularly in respect to phosphotroph metabolism.

Because the settle and decant cycles are time-consuming, anoxic wastewater may be sequentially transferred from the anoxic mix zone to a plurality of aerobic treatment zones, in order to maximize the utilization of the anoxic mix zone. In this regard, the anoxic mix zone may fill and interact with a second aerobic zone while the first aerobic treatment zone is in its settle and decant cycles. This optimizes the anoxic mix zone utilization, because it has a more constant supply of nitrate and nitrite nutrient for its operation, and reduces the equalization or "buffering" tank volume required to accommodate the continuous influent flow during the sequential treatment cycle of the system. This can also reduce the change in surge anoxic mix treatment zone operating level during the treatment cycle, and the lift level for pumping to the aeration treatment zone, which increases energy efficiency.

The present invention is also directed to multi-chamber sequencing batch reactor systems for wastewater treatment. Such treatment systems generally comprise a surge anoxic mix reaction tank, an anoxic reaction tank inlet for introducing wastewater to be treated into the anoxic reaction tank, and an aeration reaction tank for mixing and aerating wastewater and wastewater treatment microorganisms, and a pump for introducing waste liquid from the surge anoxic mix reaction tank to the aeration reaction tank. The aeration reaction tank will include an aerator for aerating wastewater in the aerobic reaction tank and a decanter for withdrawing liquid from the top of the aerobic reaction tank. An important component of the treatment system is a means for introducing wastewater from the aerobic reaction tank to the anoxic mix treatment tank, preferably while wastewater from the anoxic mix tank is pumped into the aeration reaction tank. The means for transferring wastewater from the anoxic mix tank to the sequencing aeration tank is desirably a pump such as an air lift pump or a centrifugal pump or pumps having a total pumping capacity of at least about 2 and preferably at least 3 times the average daily design treatment flow capacity of the wastewater treatment system, and the means for introducing wastewater from the aerobic reaction tank into the anoxic reaction tank is preferably a passive overflow design having an intake orifice or weir at a predetermined top liquid level in the aeration reaction tank and which discharges into the anoxic reaction tank. Separate pumping systems may be used to respectively pump from the anoxic mix zone to the aerobic zone, and from the aerobic zone to the anoxic mix zone. However, the use of a passive overflow weir is particularly efficient and maintenance free, and advantageously returns surface scum to the anoxic tank for further processing. In addition, it accommodates continuous flow without valving between tanks, and still allows for quiescent settling.

DETAILED DESCRIPTION OF THE INVENTION

In accordance with method aspects of various embodiments of the present invention, wastewater to be treated may be introduced sequentially into interacting mixed liquor treatment zones containing waste solids, including treatment microorganisms. The aerobic wastewater mixed liquor is aerated under predetermined conditions for a period of time to reduce the biological oxygen demand of the wastewater. The mixed liquor may be subsequently maintained in a quiescent state in the sequencing batch aeration zone for a settling period to form a clarified upper layer and a stratified lower layer containing waste solids. For many systems, typically the mixing and aeration time period (fill and interact) may be in the range of from about 1 hour to about 5 hours, and preferably from about 2 to about 4 hours. The settling, quiescent period will typically be less than about 2 hours, and preferably in the range of from about 30 minutes to about 90 minutes. The decantation time will typically be in the range of from about 0.1 to about 1 hour. These times are per treatment cycle.

Figure 3:
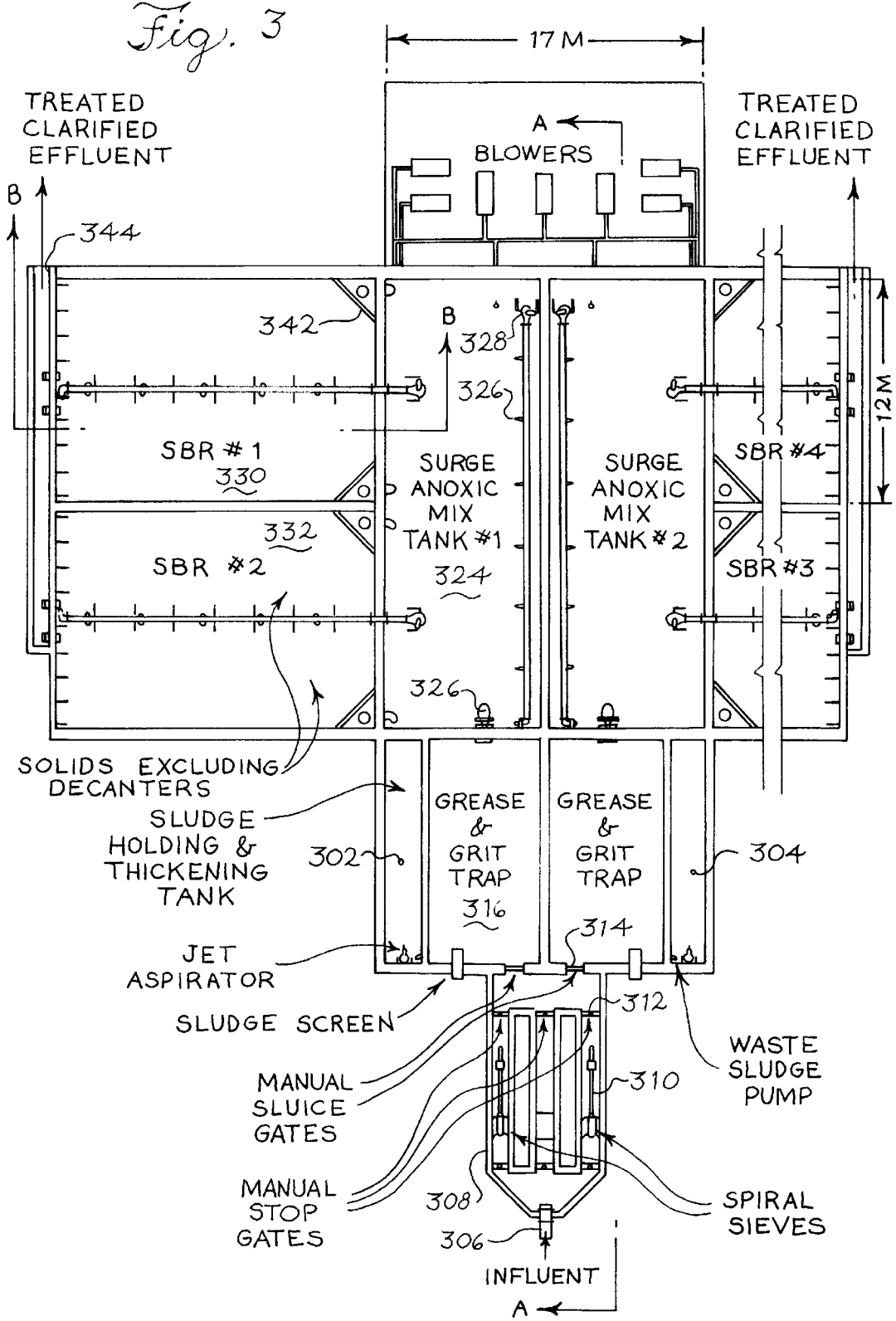
FIG. 3 is a plan view of a dual treatment reservoir sequencing batch reactor wastewater treatment plant, utilizing a surge anoxic mix treatment design in accordance with an embodiment of the present invention.
Figure 4:
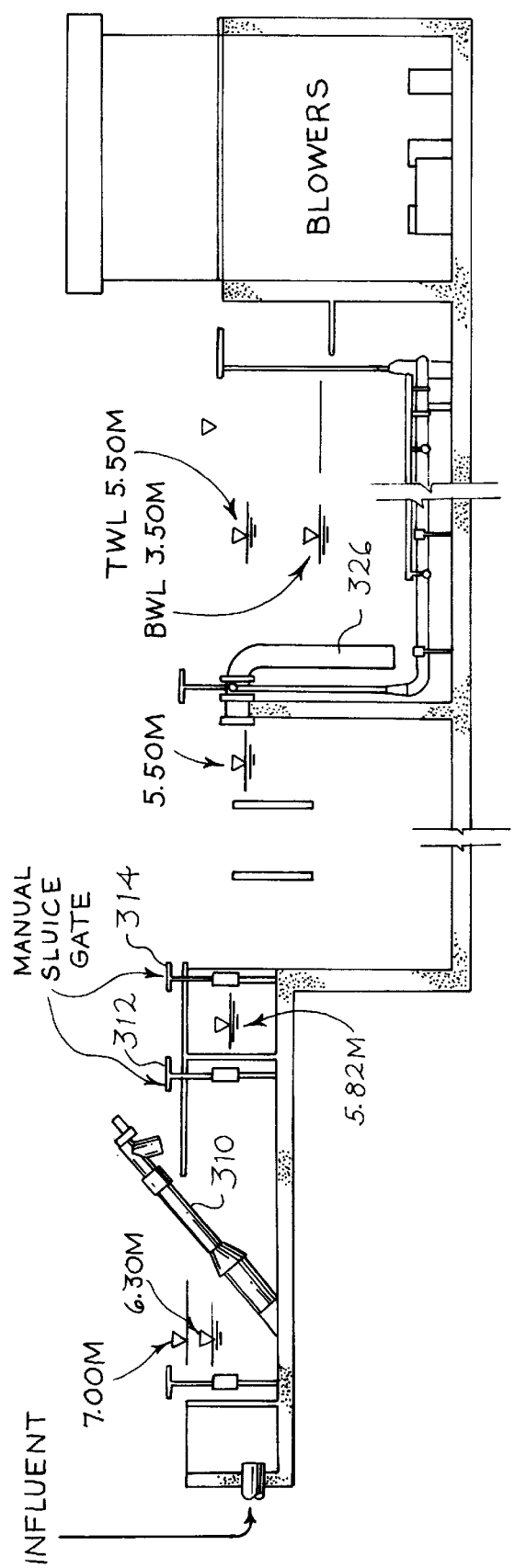
FIG. 4 is a cross sectional side view, partially broken away, of the surge anoxic mix, sequencing batch wastewater treatment plant of FIG. 3 taken through line A—A.
Figure 5:
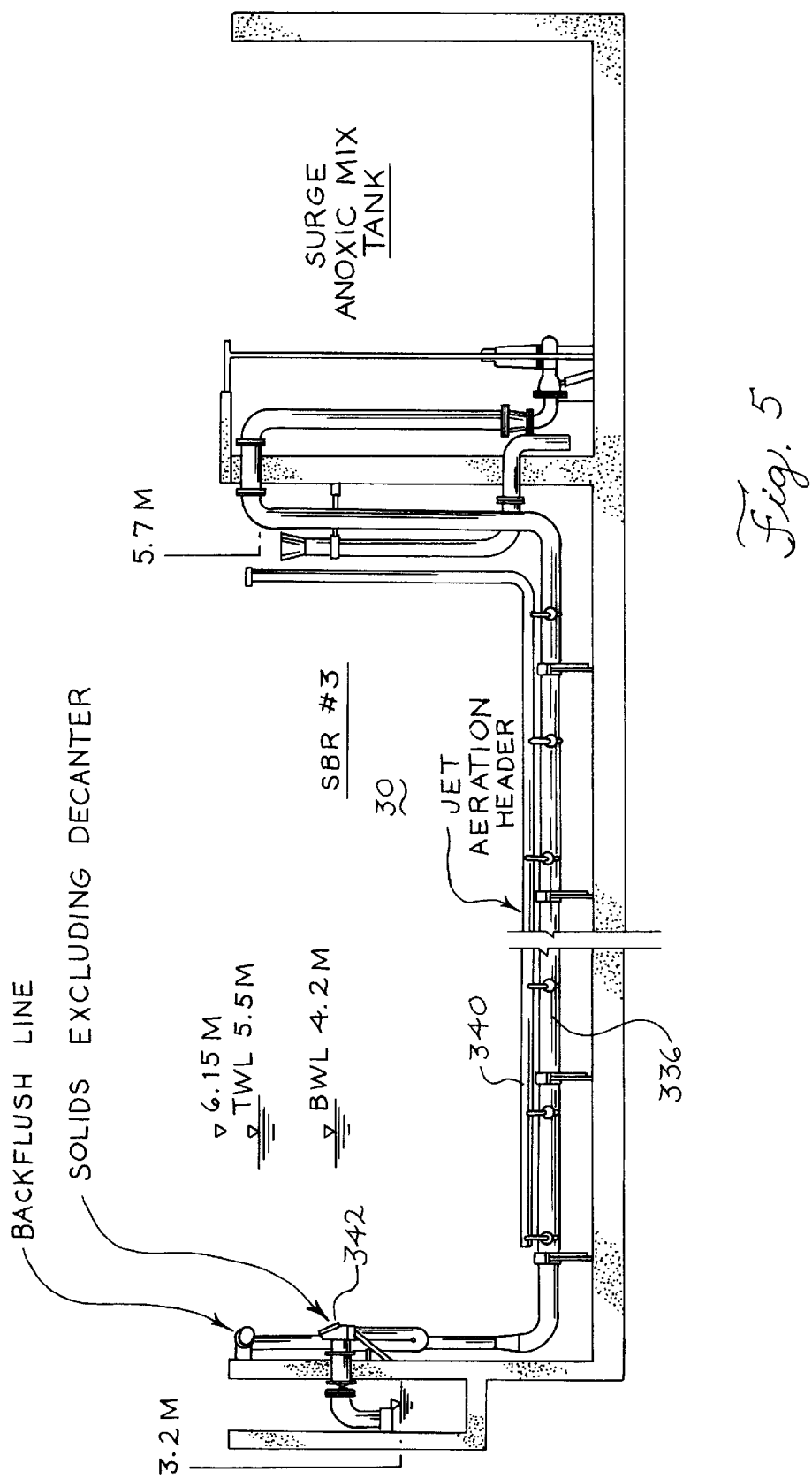
FIG. 5 is a cross sectional side view of the surge anoxic mix chamber and the sequencing batch reaction chamber of the treatment plant of FIG. 3 taken through line B—B of FIG. 4.

Illustrated in FIG. 1 is a schematic process flow diagram of an embodiment of a surge anoxic mix, sequencing batch reaction process in accordance with the present invention, which illustrates a mode of operation of the wastewater treatment system shown in FIGS. 3, 4 and 5.

As shown in FIG. 1, in accordance with various embodiments of the wastewater treatment methods of the present invention, an influent stream 100 of wastewater to be treated is continuously introduced into a surge anoxic mix treatment zone 102 which is adjacent to an aerated sequencing batch reaction zone 104. The wastewater 8 to be treated may typically be municipal wastewater, which is generated continuously, although the flow rate may vary both seasonally, and over the course of each day or week. The influent stream may be introduced directly from the municipal, industrial or other generating source, but will typically be pretreated by grit and solids removal systems, and may be first introduced into an anaerobic treatment zone, such as a "trash trap", before introduction into the anoxic mix zone. In some embodiments of the present invention, the anaerobic treatment zone may be used to further reduce solids produced by the system, as will be described.

In FIG. 1, the treatment method is illustrated in five treatment phases: an initial fill phase, an interaction phase, an optional react phase, a clarification phase, and a treated effluent removal phase. In the fill phase, the aeration treatment zone is filled with wastewater from the anoxic mix zone, as influent wastewater to be treated is introduced into the anoxic mix zone. The introduction of the wastewater into the aerated batch reactor zone 104 is begun at a relatively low liquid level in the aerated zone 104. The surge anoxic mix zone 102 and the sequencing batch (aeration) reaction zone 104 contain mixed liquor including retained, "activated sludge" treatment microorganisms. The surge anoxic mix zone 102 may be mechanically or hydraulically mixed, but is generally not fully aerated, such that it is in an anoxic condition conducive to utilization of nitrates and nitrites as oxidizing agents by the mixed liquor bacterial cultures in the zone. The sequencing batch reaction zone 104 is relatively highly aerated, and is also mixed either mechanically or hydraulically, such that the mixed liquor in the zone is in an aerated condition conducive to the utilization of oxygen as the oxidizing agent by the mixed liquor cultures in the aerated zone 104. The fill phase is continued until the aerated reaction zone is filled to a predetermined height or volume. Preferably, this height will be determined by the intake height of a passive liquid return weir and conduit for returning liquid to the anoxic mix zone. The fill step may be, or is, terminated when the aerobic SBR tank 104 is full, such that nitrate-containing wastewater from the aerobic tank zone 104 is returned to the anoxic mix zone 102.

The interaction phase follows the fill phase. During the interaction phase, the mixed liquor undergoing aerobic oxidation treatment in the SBR zone is intermixed with the mixed liquor and influent 100 undergoing anoxic treatment in the anoxic treatment zone 102, while the influent wastewater 100 is introduced into the anoxic zone. For every gallon pumped from the anoxic tank, one gallon returns from the aerobic tank. The interact step may include intermittent pumping and aeration controlled by time or dissolved oxygen and/or nitrate sensors. It is noted that filling of the treatment system (zone 102) also continues throughout the interact step, because the influent wastewater to be treated continues to flow into the anoxic treatment zone.

Any suitable pump or pumps may be utilized, such as electric motor-driven fluid pumps, or air-lift pumps. During the interaction phase or step, anoxic mixed liquor from the surge anoxic mix zone 102 is introduced into the aerated batch reaction zone 104, and aerated mixed liquor from the sequencing batch reaction zone 104 is introduced into the surge anoxic mix zone. This may be accomplished by pumping mixed liquor from the anoxic mix zone into a substantially full aerated reactor zone 102, and permitting the mixed liquor from the aerated batch reaction zone 104 to overflow back into the surge anoxic mix zone. A passive overflow system is relatively maintenance-free and energy efficient, and has other advantages such as returning any floating scum or debris to the anoxic mix zone. The pump rate (or intermixing rate) should be at least two times the average daily rate of introduction of influent wastewater 100 into the surge anoxic mix zone, and preferably will be at least 5 times the average daily rate of introduction of influent wastewater 100 into the zone 102.

It will be appreciated that in the surge anoxic mix zone, influent wastewater components, including organic components constituting BOD, are partially consumed by mixed liquor microorganisms using nitrates and nitrites produced in the aerated batch reaction zone which are transferred and mixed from the aerated zone 104 into the zone 102. Further, nitrate and nitrite components are reduced to nitrogen gas, and thereby removed from the wastewater. The anoxic mix zone has a reaction gradient of relatively high BOD and low dissolved oxygen which facilitates denitrification, while the aerobic treatment zone has a reaction gradient of relatively low BOD and high dissolved oxygen, which is more optimal for nitrification along with BOD removal. Accordingly, during the interaction phase, the wastewater components are also rapidly oxidized in the aerated batch reaction zone 104, which also produces nitrates and nitrites in the mixed liquor for utilization (and removal as $N_2$) in the surge anoxic mix zone. The interaction phase will usually constitute from about 20% to about 80% of the total cycle time of the sequencing batch reaction process.

Waste solids (sludge) may be removed from the anoxic zone during the interaction phase of the treatment cycle, or may be introduced into an anaerobic pretreatment zone, as previously discussed, for digestion and subsequent reintroduction into the anoxic mix zone to facilitate total solids reduction and/or phosphorous removal. The mixed liquor in the anoxic zone may be continuously or intermittently mixed in the anoxic zone during the interact phase in an appropriate manner, such as by jet motive pumps or by aerobic zone recycle, but will generally not be aerated (except in unusual circumstances such as influent flow conditions exceeding the system design conditions). The rate at which the mixed liquor from the anoxic mix zone is introduced into the aerated SBR zone will desirably be at least 2 and preferably at least 3 times the average influent flow rate of the influent wastewater 102, and in highly effective embodiments will be at least about 5 times the influent wastewater flow rate. In this regard, the pumping capacity should best exceed the peak design influent flow rate, which may typically be from about 2 to 4 times the average influent flow rate for municipal wastewater treatment systems.

The mixed liquor in the SBR zone 104 is continuously or intermittently aerated and mixed within the treatment zone 104, in order to efficiently and effectively foster biooxidation of the wastewater in the zone. Continuous aeration and mixing produced by motive jet aerators such as F2JA jet aerators manufactured by Fluidyne Corporation having an oxygenation transfer efficiency of at least 20% are effective for mixing and aeration in an energy efficient manner. In systems in which the progression of the treatment phase is determined by water level conditions, the interact phase may extend from the time the aerobic sequential batch aeration (SBR) zone 104 is filled (and overflows back into the anoxic zone 102, until the liquor level in the anoxic zone reaches a control water level set point, or an intermediate level if an optional aeration react phase is utilized. Alternatively, a timed treatment control system and/or nitrate and oxygen sensors may be used to control the length of the interaction phase.

As indicated, following the interaction phase, either an optional aeration reaction phase, or a clarification phase is carried out. An aeration reaction phase, even of relatively short duration, may be desirable to insure that at least the most readily biooxidizable components of the wastewater, particularly that which was most recently introduced from the anoxic treatment zone, has been treated in the SBR zone for a suitable period of time without introduction of "fresh" wastewater from the anoxic zone. During the SBR aeration reaction phase, the influent wastewater continues to be introduced into the anoxic zone, which serves as a volume buffer as it fills. The anoxic zone may be mixed or stirred, but wastewater is generally not introduced in significant amounts from the anoxic zone 102 into the SBR zone 104 during the optional reaction phase, if such a phase is utilized.

Following the reaction phase, or the interaction phase if no reaction phase is utilized, a clarification step is carried out in which the mixing and aeration in the SBR zone 104 is stopped, so that it becomes quiescent for settling of the microbiological treatment cultures to provide a clarified upper layer. The time to achieve effective clarification will typically be about 45 minutes. It is noted that during the clarification phase in the SBR zone 104, the influent wastewater 100 may continue to be introduced into the anoxic treatment zone 102, raising the liquid level in the zone 102. The clarification and settling phase is continued for a predetermined amount of time sufficient to allow biological solids to settle well below the bottom water level achieved in the SBR zone 104 after decant.

In this regard, after the mixed liquor in the SBR zone 104 has settled to provide a clarified upper zone 106 and a lower sludge zone 108, the treated, clarified effluent in the zone 106 is removed, preferably to a predetermined level, without substantially remixing the settled sludge. Decanting systems such as the fixed, air operating solids excluding decanter (SED) decanting systems described in U.S. Pat. No. 4,596,658 and manufactured by Fluidyne Corporation may be used to decant surface water without substantial turbulence. Typically, at least about 15% of the water in the SBR zone will be decanted in the effluent removal phase. During the effluent removal phase, the influent wastewater may continue to be introduced into the anoxic mix zone 102, raising the water level to its maximum height. Without the intermixing of nitrate-containing mixed liquor from the SBR zone, the mixed liquor in the zone 102 may become anaerobic if left too long, and accordingly may be mixed or moderately aerated if appropriate.

Following the effluent removal phase (decant), the treatment cycle is repeated. The aerobic SBR zone 104 is filled in a fill phase by pumping mixed liquor from the filled anoxic mix zone 102 into the SBR zone 104, which is at its low water level following clarified effluent removal, and the remaining steps are repeated.

Such sequencing batch reactor systems of surge anoxic mix interaction design having an anoxic mix chamber interacting with a sequencing batch aeration and decantation chamber can provide significant advantages over conventional sequencing batch reactors having a single sequencing batch aeration and decantation processing chamber. The following calculated design comparison of a conventional sequencing batch reactor system and a sequencing batch reactor system of interacting surge anoxic mix design illustrates some of the potential advantages. The comparison shows total tank volume reduced to 71% of the conventional SBR volume (1.08 mg vs 0.77 mg), and operating power requirements reduced from 56 blip to 44 bhp:

TABLE 1

|  | Conventional Sequencing Batch Reactor System | Aerobic SBR with Interacting Surge Anoxic Mix Zone |
|---|---|---|
| INFLUENT CONDITIONS |  |  |
| Flow (m3/d) | 3785 | 3785 |
| Flow (mgd) | 1.000 | 1.000 |
| Flow (gpm) | 694 | 694 |
| BOD (mg/l) | 200 | 200 |
| BOD (lb/d) | 1668 | 1668 |

TABLE 1-continued

| | Conventional Sequencing Batch Reactor System | Aerobic SBR with Interacting Surge Anoxic Mix Zone |
|---|---|---|
| TSS (mg/l) | 200 | 200 |
| TSS (lb/d) | 1668 | 1668 |
| NH3-N (mg/l) | 30 | 30 |
| NH3-N (lb/d) | 250 | 250 |
| OXYGEN REQUIREMENTS | | |
| Lbs. TKN required for synthesis | 58 | 58 |
| Lbs. NO3-N produced | 192 | 192 |
| Lbs. 02 recovered/lb NO3-N reduced | | 2.6 |
| Lbs. Oxygen/lb. Of BOD | 1.4 | 1.4 |
| Lbs. Oxygen/lb. TKN | 4.6 | 4.6 |
| Actual Oxygen Demand (lb 02/d) Total | 3486 | 2719 |
| Alpha | 0.9 | 0.9 |
| Beta | 0.95 | 0.95 |
| Theta | 1.024 | 1.024 |
| Operating Dissolved Oxygen (mg/l) | 1 | 1 |
| Clean Water Oxygen Sat. at Op. Temp (Mg/l) | 9.09 | 9.09 |
| Clean Water oxygen sat. at Std. Temp (mg/l) | 9.09 | 9.09 |
| Clean Water 02 sat, std temp, mid depth (mg/l) | 11.50 | 11.50 |
| Std. Condition ambient pressure (psia) | 14.7 | 14.7 |
| Oper. Condition ambient pressure (psia) | 14.5 | 14.5 |
| Wastewater temperature (c) | 20 | 20 |
| SOR/AOR ratio | 1.31 | 1.31 |
| Standard Oxygen Demand (lb 02/d) total | 4557 | 3554 |
| Standard Oxygen Demand (lb/02/hr) | 380 | 296 |
| Specific oxygenation rate (mg/l-hr) | 42 | 70 |
| Lbs. of oxygen/lb. Of air | 0.23 | 0.23 |
| Clean Water Efficiency (%) | 25 | 25 |
| Lbs. of Air/Cubic Ft. of air | 0.075 | 0.075 |
| Aeration hours per day | 12.00 | 12.00 |
| Air flow rate (SCFM/tank) | 734 | 572 |
| NITRIFICATION/DENITRIFICATION | | |
| Required alkalinity for nitrification (mg/l) | 164 | 164 |
| Alkalinity recovered, denitrification (mg/l) | 69 | 69 |
| Net alkalinity required (mg/l) | 95 | 95 |
| Mixed liquor temperature, C. | 15 | 15 |
| ML dissolved oxygen (mg/l) | 1 | 1 |
| Max. nitrifier growth rate, day-1 | 0.204 | 0.204 |
| Minimum solids retention time (SRT) required for nitrification, days | 4.89 | 4.89 |
| Actual or Design SRT, days | 19.27 | 8.68 |
| Kn, half velocity constant (mg/l) | 0.40 | 0.40 |
| Design growth rate for heterotrophs/nitrifiers | 0.0519 | 0.1152 |
| Projected effluent soluble NH3-N, mg/l | 0.14 | 0.52 |
| Specific utilization rate, lbs BOD5/lb mlvss | 0.19 | 0.30 |
| Lbs. mlvss required for BOD & NH3 removal | 9002 | 5552 |
| mlvss (mg/l) | 1500 | 1500 |
| Tank volume req. for BOD & NH3 removal (MG) | 0.72 | 0.44 |
| Denitrification rate (g/g/day) | 0.043 | 0.047 |
| lbs mlvss required for denitrification | 4484 | 4076 |
| Tank volume required for NO3 removal (MG) | 0.36 | 0.33 |
| SBR Tank Configuration | | |
| No. of tanks | 2 | 2 |
| Length SBR (ft) | 90 | 42 |
| Length Surge anoxic tank (ft) | | 27 |
| Width (ft) | 45 | 45 |
| Bottom water level (ft) | 14 | 14 |
| Top water level (ft) | 18 | 18 |
| Cycle Water Level | | 15 |
| No. decanters/tank | 4 | 4 |
| SBR tankage volume a TWL(MG) | 1.0906 | 0.5089 |
| HRT (hrs) | 26.17 | 12.21 |
| CYCLE TIMES/CAPACITY CALCULATIONS | | |
| Total Decant Volume (cubic feet) | 32,400 | 15,120 |
| Total Decant Volume (gallons) | 242,352 | 113,098 |
| Decant volume per tank (gallons) | 121,176 | 56,549 |
| Number of cycles per day/tank | 4.13 | 8.84 |
| Total time per cycle (minutes) | 349 | 163 |
| Fill rate (gpm) | 694 | 2730 |
| Fill time (minutes) | 174 | 21 |
| Feed rate (gpm) | 694 | 347 |
| Interact period (minutes) | | 81 |
| React period (minutes) | 69 | |
| Settle period (minutes) | 45 | 45 |
| Average decant rate (gpm/ft decanter) | 100 | 100 |
| Decanter length (feet) | 36 | 36 |
| Decanting time (minutes) | 34 | 16 |
| Decanting rate (gpm) | 3600 | 3600 |
| Peak decanting rate (gpm at start of decant) | 3960 | 3960 |
| Idle period time (minutes) | 27 | 0 |
| Zero idle & react time, flow rate (MGD) | 2.22 | 2.00 |
| Maximum aeration period available (hours/day) | 13.85 | 15.05 |
| EQUIPMENT SELECTION | | |
| Air flow per nozzle (scfm) | 38 | 38 |
| Number of nozzles required (per tank) | 19.31 | 15.06 |
| Number of nozzles provided (per tank) | 20 | 16 |
| Actual airflow per nozzle required (scfm) | 36.69 | 35.77 |
| Blower capacity provided (scfm) | 734 | 572 |
| POWER CONSUMPTION CALCULATIONS | | |
| Pump Efficiency | 0.76 | 0.76 |
| Blower Efficiency | 0.6 | 0.6 |
| Pump horsepower, BHP/tank | 24 | 19 |
| Mixing BHP/MG | 32 | 25 |
| Blower horsepower/BHP/tank | 58 | 44 |
| Total horsepower, BHP/tank | 56 | 44 |
| Aeration BHP/MG | 103 | 174 |
| Total design equivalent horsepower, BHP | 56 | 44 |
| SLUDGE PRODUCTION | | |
| Sludge Yield Factor | 0.7 | 0.7 |
| Net Sludge Yield (lbs/d) | 1012 | 1048 |
| Sludge Concentration (%) from SBR | 0.21 | 0.21 |
| Sludge Wasting Rate (gpd) | 56609 | 58644 |
| Waste Sludge/cycle (gal) | 6860 | 3316 |
| WAS Pumping Rate (gpm) | 75 | 75 |
| Waste Sludge Cycle Time (min) | 91.5 | 44.2 |
| Thickened Sludge Concentration (%) | 1.5 | 1.5 |
| Thickened Sludge (gpd) | 8087 | 8378 |
| MLSS (mg/10 @ TWL) | 2143 | 2143 |
| Sludge Inventory Total (lbs) | 19490 | 14943 |
| Sludge Inventory in SBR (lbs) | 19490 | 9595 |
| SRT (1/days) Total | 19.27 | 14.26 |
| SRT in SBR (1/days) | 19.27 | 8.68 |
| F/M | 0.09 | 0.11 |
| SVl (ml/g) | 200 | 200 |
| Sludge blanket level (ft) | 7.73 | 7.73 |
| Organic loading (lbs (BOD/1000 ft3) | 11.44 | 14.92 |

Figure 2:
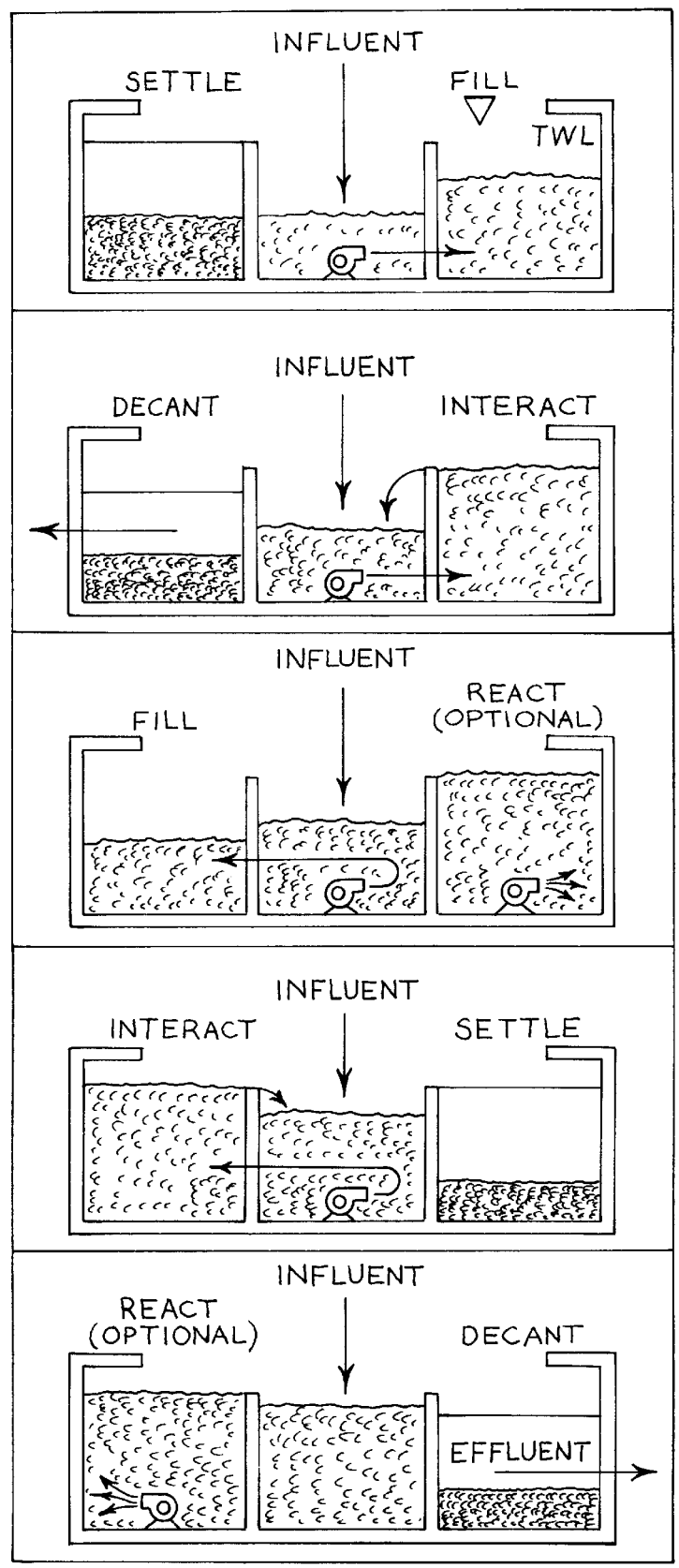
FIG. 2 is a schematic process flow diagram of another embodiment of the present invention similar to that illustrated in FIG. 1, in which mixed liquor from one surge anoxic mix zone alternately interacts with two aerated batch reaction and decantation zones.

As discussed in connection with the treatment methods embodiment illustrated in FIG. 1, there is little or no interaction between the wastewater and microbial treatment cultures in the surge anoxic mix zone, and the SBR zone during clarification phase and the optional react phase of the treatment cycle. Thus, the introduction of nitrate/nitrite components which serve as oxidation energy source is cyclical to the surge anoxic mix zone in the methods of FIG. 1. Depending on factors such as the relative amount of BOD and nitrogen to be removed from the influent wastewater, and the storage volumes appropriate to accommodate the influent wastewater during the various sequencing treatment steps, it may be desirable to provide more continuous interaction between the surge anoxic mix zone and an aerated SBR zone. In this regard, schematically illustrated in FIG. 2 is an alternative embodiment of a wastewater treatment method similar to that of FIG. 1, but in which a surge anoxic mix zone 202 interacts with a plurality of (here, two) aerated sequencing batch reaction zones 104, 106 having staggered treatment cycles such that fill and interaction phases of one aeration zone correspond to the settle and decant phases of the other aeration zone. As shown in FIG. 2, the surge anoxic mix zone 202 has a double cycle which alternates between the two SBR zones 204, 206, so that it is substantially continuously filling and/or interacting with at least one of the SBR zones 204, 206 during the quiescent and decant phases of the other. The size of anoxic vs. aerobic treatment zones is a function of reaction treatment by kinetics as well as hydraulic requirements. The hydraulic considerations of feeding two aerobic treatment zones with one surge anoxic mix zone permits a smaller anoxic zone to total aerobic zone volume-ratio, or conversely less draw down in the surge anoxic mix zone for the same volume ratio. Typically, the biokinetics will be used to calculate the tank sizing, which may then be adjusted for hydraulic requirements of the influent flow.

As shown in FIG. 2, the "first" of the surge anoxic mix cycles is initiated with one of the SBR zones 204. Then, during the (optional) react phase, clarification phase and effluent removal phase of the SBR treatment zone 204 during which there is no substantial interaction between the surge anoxic mix zone 202 and the SBR zone 204, a "second" interaction cycle is initiated between the surge anoxic mix zone 202 and the second SBR zone 206. As will be appreciated from FIG. 2, by offsetting the cycles of the two aeration and decantation zones, the anoxic mix zone may be more effectively utilized. Such a method may provide enhanced biological efficiency in the surge anoxic mix zone, and cost improvements related to tankage volume utilization improvements because less surge anoxic mix storage capacity may be needed to accommodate a continuous wastewater influent flow for a given SBR cycle time. Operational advantages include less anoxic mix level drawn down, more consistency in $NO_3$ return and mixing without auxiliary mixers, and better hydraulic peak flow handling. Disadvantages include redundancy and turn down. Particularly in view of the high capacity of dual feed methods and treatment systems like that of FIG. 2, and particularly at low influent flow conditions, there may be an "idle" time period following the decant step in the respective aerobic zones before there is sufficient influent to being a new full step.

As indicated previously, the present invention is also directed to multi-chamber sequencing batch reactors for wastewater treatment which are designed to utilize interacting anoxic and aerated aerobic sequencing batch reaction tanks. Such SBR systems comprise an anoxic reaction tank having an inlet for introducing wastewater to be treated into the anoxic reaction tank, sequencing batch aerobic reaction tank (SBR) for receiving wastewater from the anoxic reaction tank and for sequentially mixing and aerating wastewater and wastewater treatment microorganisms, settling the wastewater, and withdrawing clarified water from the top of the aerobic reaction tank and for introducing wastewater from the aerobic reaction tank to the anoxic mix treatment tank.

The sequencing batch reaction system will desirably include a pump for transferring wastewater from the anoxic mix tank to the sequencing aerobic batch reaction tank having a pumping capacity of at least about 0.2, and preferably from about 0.5 to 5 times the anoxic mix tank volume per hour and a passive overflow weir at a predetermined or adjustable top liquid level in the aerobic reaction tank for introducing wastewater from the aerobic reaction tank into the anoxic reaction tank. The systems may include a bottom water level control system for the aerobic reaction tank, which initiates a system fill cycle when triggered by the water level in the aerobic SBR tank reaching the bottom water level (BWL). The control system operates to start feed and/or jet motive pump to pump from the surge anoxic mix tank to the aerobic reaction tank. After the SBR tank is full and after predetermined (adjustable) time period after fill or until a dissolved oxygen set point is reached, the control system operates to continue to cycle feed and/or jet motive pump based on time and/or D.O. and/or $NO_3$ levels on a continuous or intermittent basis during the interaction phase, as previously described. The control system also includes a control water level (CWL) sensor in the surge anoxic mix tank. The control system operates such that when the surge anoxic mix tank wastewater level reaches CWL, the control water level in the surge anoxic mix tank, the feed pump and/or jet motive pump is stopped and a settle timer is started for the clarification cycle. After the settle timer times out, start decant. The SBR level reaches bottom decant level BWL, start feed and/or jet motive pump (or waste sludge pump first).

Illustrated in FIGS. 3–5 is an embodiment 300 of a surge anoxic mix, sequencing batch reactor municipal wastewater treatment plant designed for a nominal peak treatment capacity of 0.5 to 4.4 mgd. The system has a relatively high ratio of peak hydraulic flow to average influent flow, demonstrating the versatility of the system (it is noted that at peak flow, the system does not operate to separately produce $NO_3$. FIG. 3 is a plan view of the system 300, which has two separate, and substantially identical, treatment systems 302, 304 (phase 1 and phase 2). The design specifications for the treatment system 300 are set forth in the following Table 2 for the average daily wastewater (ADW) design flow rate, and the peak design flow rate, with specification and terms as defined in Mandt, et al. supra:

TABLE 2

| | Average Daily Waste Water Flow PHASE 1 | Peak Hydraulic Flow PHASE 1 | Average Daily Waste Water Flow PHASE 2 | Peak Hydraulic Flow PHASE 2 | Peak Metric PHASE |
|---|---|---|---|---|---|
| Influent Conditions | | | | | |
| Flow (m3/d) | 2534 | 8697 | 4626 | 16430 | |
| Flow (mgd) | 0.669 | 2.298 | 1.222 | 4.351 | |
| Flow (gpm) | 465 | 1596 | 849 | 3014 | 190 lps |
| BOD (mg/l) | 161 | 94 | 147 | 83 | |
| BOD (lb/d) | 900 | 1800 | 1503 | 3005 | 1366 kg/d |

TABLE 2-continued

|  | Average Daily Waste Water Flow PHASE 1 | Peak Hydraulic Flow PHASE 1 | Average Daily Waste Water Flow PHASE 2 | Peak Hydraulic Flow PHASE 2 | Peak Metric PHASE |
|---|---|---|---|---|---|
| TSS (mg/l) | 116 | 68 | 121 | 68 | |
| TSS (lb/d) | 647 | 1294 | 1232 | 2464 | 1120 kg/d |
| NH3-N (mg/l) | 30 | 17 | 30 | 17 | |
| NH3-N (lb/d) | 168 | 335 | 306 | 612 | 278 kg/d |
| OXYGEN REQUIREMENTS | | | | | |
| Lbs. TKN required for synthesis | 31 | 63 | 53 | 105 | |
| Lbs. NO3-N produced | 136 | 0 | 253 | 0 | |
| Lbs. 02 recovered/lb NO3-N reduced | 2.6 | 0.0 | 2.6 | 0.0 | |
| Lbs. Oxygen/lb. of BOD | 1.4 | 1 | 1.4 | 1 | |
| Lbs. Oxygen/lb. TKN | 4.6 | 0 | 4.6 | 0 | |
| Actual Oxygen Demand (lb 02/d) Total | 1532 | 1800 | 2610 | 3005 | 1366 kg/d |
| Alpha | 0.9 | 0.9 | 0.9 | 0.9 | |
| Beta | 0.95 | 0.95 | 0.95 | 0.95 | |
| Theta | 1.024 | 1.024 | 1.024 | 1.024 | |
| Operating Dissolved Oxygen (mg/l) | 2 | 0.5 | 2 | 1 | |
| Clean Water Oxygen Sat. at Op. Temp (Mg/l) | 9.09 | 9.09 | 9.09 | 9.09 | |
| Clean Water Oxygen Sat. at Std. Temp (mg/l) | 9.09 | 9.09 | 9.09 | 9.09 | |
| Clean Water 02 Sat, Std Temp, Mid Depth (mg/l) | 11.50 | 11.50 | 11.50 | 11.50 | |
| Std. Condition Ambient Pressure (psia) | 14.7 | 14.7 | 14.7 | 14.7 | |
| Oper. Condition Ambient Pressure (psia) | 14.5 | 14.5 | 14.5 | 14.5 | |
| Wastewater Temperature (C.) | 20 | 20 | 20 | 20 | |
| SOR/AOR ratio | 1.46 | 1.24 | 1.46 | 1.31 | |
| Standard Oxygen Demand (lb 02/d) total | 2230 | 2238 | 3800 | 3928 | |
| Standard Oxygen Demand (lb/02/hr) | 161 | 230 | 300 | 391 | |
| Specific Oxygenation Rate (mg/l-hr) | 33 | 47 | 30 | 40 | |
| Lbs. of Oxygen/Lb. of Air | 0.23 | 0.23 | 0.23 | 0.23 | |
| Clean Water Efficiency (%) | 25 | 25 | 25 | 25 | |
| Lbs. of Air/Cubic Ft. of Air | 0.075 | 0.075 | 0.075 | 0.075 | |
| Aeration Hours Per Day | 13.88 | 13.88 | 13.88 | 13.88 | |
| Air Flow Rate (SCFM/tank) | 311 | 445 | 290 | 378 | |
| Air Pressure Losses (lines and nozzle) | 0.7 | 0.7 | 0.7 | 0.7 | |
| Maximum Air Pressure (psig) | 7.64 | 7.64 | 7.64 | 7.64 | |
| Average Air Pressure (psig) | 6.72 | 6.72 | 6.72 | 6.72 | |

TABLE 2-continued

| | Average Daily Waste Water Flow PHASE 1 | Peak Hydraulic Flow PHASE 1 | Average Daily Waste Water Flow PHASE 2 | Peak Hydraulic Flow PHASE 2 | Peak Metric PHASE |
|---|---|---|---|---|---|
| NITRIFICATION/ DENITRIFICATION | | | | | |
| Required alkalinity for nitrification (mg/l) | 174 | 0 | 177 | 0 | |
| Alkalinity recovered, denitrification (mg/l) | 73 | 0 | 75 | 0 | |
| Net alkalinity required (mg/l) | 101 | 0 | 103 | 0 | |
| Mixed liquor temperature, C. | 20 | 20 | 20 | 20 | |
| ML dissolved oxygen (mg/l) | 1 | 1 | 1 | 1 | |
| Max. nitrifier growth rate, day-1 | 0.334 | 0.334 | 0.334 | 0.334 | |
| Minimum SRT required for nitrification, days | 3.00 | 3.00 | 3.00 | 3.00 | |
| Kn, half velocity constant (mg/l) | 0.73 | 0.73 | 0.73 | 0.73 | |
| Design growth rate for heterotrophs/nitrifiers | 0.0366 | 0.0813 | 0.0293 | 0.9665 | |
| Projected effluent soluble NH3-N, mg/l | 0.09 | 0.23 | 0.07 | 0.18 | |
| Specific utilization rate, lbs BOD5/lb mlvss | 0.16 | 0.24 | 0.14 | 0.21 | |
| Lbs. mlvss required for BOD & NH3 removal | 5713 | 7541 | 10427 | 14185 | |
| mlvss (mg/l) | 2000 | 2000 | 2000 | 2000 | |
| Tank volume req. for BOD & NH3 removal (MG) | 0.34 | 0.45 | 0.63 | 0.85 | |
| Aerobic hrs/day required, hr. | 13.88 | 18.32 | 12.66 | 17.23 | |
| Denitrification rate (g/g/day) | 0.060 | 0.060 | 0.060 | 0.060 | |
| Lbs mlvss required for denitrification | 2267 | 0 | 4220 | 0 | |
| Tank volume required for NO3 removal (MG) | 0.14 | 0/00 | 0.25 | 0.00 | |
| Anoxic hrs/d required/hr. | 5.51 | 0.00 | 5.13 | 0.00 | |
| Total tank volume required (MG) | 0.48 | 0.45 | 0.88 | 0.85 | |
| SBR TANK CONFIGURATION | | | | | |
| No. of tanks | 2 | 2 | 4 | 4 | |
| Length (ft) | 55.76 | 55.76 | 55.76 | 55.76 | 17 |
| Width (ft) | 39.36 | 39.36 | 39.36 | 39.36 | 12 |
| Bottom water level (ft) | 13.776 | 13.776 | 13.776 | 13.776 | 4.2 |
| Top water level (ft) | 18.04 | 18.04 | 18.04 | 18.04 | 5.5 |
| No. decanters/tank | 2 | 2 | 2 | 2 | |
| Total Tankage Volume @ TWL (MG) | 0.5923 | 0.5923 | 1.1846 | 1.1846 | |
| HRT (hrs) | 21.23 | 6.19 | 23.26 | 6.55 | |
| CYCLE TIMES/ CAPACITY CALCULATIONS | | | | | |
| Total Decant Volume (cubic feet) | 18,717 | 18,717 | 37,433 | 37,433 | 1061 M3 |
| Total Decant Volume (gallons) | 140,000 | 140,000 | 279,999 | 279,999 | |
| Decant volume per tank (gallons) | 70,000 | 70,000 | 70,000 | 70,000 | 265.2 M3/tank |

TABLE 2-continued

|  | Average Daily Waste Water Flow PHASE 1 | Peak Hydraulic Flow PHASE 1 | Average Daily Waste Water Flow PHASE 2 | Peak Hydraulic Flow PHASE 2 | Peak Metric PHASE |
| --- | --- | --- | --- | --- | --- |
| Number of cycles per day/tank | 4.78 | 13.29 | 4.36 | 12.99 | |
| Total time per cycle (minutes) | 301 | 108 | 330 | 111 | |
| Fill rate (gpm) | 2389 | 2389 | 2389 | 2389 | |
| Fill time (minutes) | 29 | 29 | 29 | 29 | |
| Fill time surge anoxic mix tank (minutes) SWL | 121 | 15 | 53 | 17 | |
| Interact period (min) | 121 | 15 | 53 | 17 | |
| Settle period (minutes) | 45 | 45 | 45 | 45 | |
| Average decant rate (gpm/ft decanter) | 100 | 100 | 100 | 100 | |
| Decanter length (feet) | 36 | 36 | 36 | 36 | |
| Decanting time (minutes) | 19 | 19 | 19 | 19 | |
| Decanting rate (gpm) | 3600 | 3600 | 3600 | 3600 | |
| Peak decanting rate (gpm at start of decant) | 3960 | 3960 | 3960 | 3960 | |
| Idle period time (minutes) | 86 | 0 | 183 | 0 | |
| Zero idle & react time, flow rate (MGD) | 1.57 | 1.57 | 1.57 | 1.57 | |
| Maximum aeration period available (hours/day) | 18.86 | 9.72 | 19.31 | 10.05 | |
| EQUIPMENT SELECTION | | | | | |
| Air flow per nozzle (scfm) | 35 | 35 | 35 | 35 | |
| Number of nozzles required (per tank) | 8.87 | 12.71 | 8.28 | 10.79 | |
| Number of nozzles provided (per tank) | 14 | 14 | 14 | 14 | |
| Actual airflow per nozzle required (scfm) | 22.18 | 31/78 | 20.71 | 26.97 | |
| Blower capacity provided (scfm) | 311 | 445 | 290 | 378 | |
| POWER CONSUMPTION CALCULATIONS | | | | | |
| Pump efficiency | 0.73 | 0.73 | 0.73 | 0.73 | |
| Blower efficiency | 0.6 | 0.6 | 0.6 | 0.6 | |
| Pump horsepower, BHP/tank | 14 | 14 | 14 | 14 | |
| Mixing BHP/MG | 49 | 49 | 49 | 49 | |
| Blower horsepower, BHP/tank | 14 | 20 | 13 | 17 | |
| Total horsepower, BHP/tank | 28 | 34 | 27 | 31 | |
| Aeration BHP/MG | 95 | 115 | 92 | 105 | |
| Total design equivalent horsepower, BHP | 39 | 28 | 70 | 52 | |
| SLUDGE PRODUCTION | | | | | |
| Sludge Yield Factor | 0.7 | 0.7 | 0.7 | 0.7 | |
| Net Sludge Yield (lbs/d) | 517 | 1147 | 826 | 1878 | |
| Sludge Concentration (%) from SBR | 0.29 | 0.29 | 0.29 | 0.29 | |
| Sludge Wasting Rate (gpd) | 21695 | 48139 | 34664 | 78805 | |
| Waste Sludge/cycle (gal) | 2268 | 1810 | 1985 | 1517 | |

TABLE 2-continued

|  | Average Daily Waste Water Flow PHASE 1 | Peak Hydraulic Flow PHASE 1 | Average Daily Waste Water Flow PHASE 2 | Peak Hydraulic Flow PHASE 2 | Peak Metric PHASE |
|---|---|---|---|---|---|
| WAS Pumping Rate (gpm) | 50 | 50 | 50 | 50 |  |
| Waste Sludge Cycle Time (min) | 45.4 | 36.2 | 29.7 | 30.3 |  |
| Thickened Sludge Concentration (%) | 1.5 | 1.5 | 1.5 | 1.5 |  |
| Thickened Sludge (gpd) | 4132 | 9169 | 6603 | 15011 |  |
| MLSS (mg/l) @ TWL | 2857 | 2867 | 2867 | 2867 |  |
| Sludge inventory (lbs) | 14114 | 14114 | 28228 | 28228 |  |
| SRT (1/days) | 27.30 | 12.30 | 34.17 | 15.03 |  |
| F/M | 0.06 | 0.13 | 0.05 | 0.11 |  |
| SVI (ml/g) | 200 | 200 | 200 | 200 |  |
| Sludge blanket level (ft) | 10.32 | 10.32 | 10.32 | 10.32 |  |
| Organic loading (lbs BOD/1000 ft3) | 11.36 | 22.73 | 9.49 | 18.98 |  |
| AEROBIC DIGESTER |  |  |  |  |  |
| Number of tanks | 1 | 1 | 2 | 2 |  |
| Length (ft) | 55.76 | 55.76 | 55.76 | 55.76 | 17 |
| Width (ft) | 39.36 | 39.36 | 39.36 | 39.36 | 12 |
| TWL (ft) | 18.04 | 18.04 | 18.04 | 18.04 | 5.5 |
| Total volume (gal) available | 296,153 | 296,153 | 592,306 | 592,306 |  |
| Days sludge storage available | 71.67 | 32.30 | 89.71 | 39.46 |  |
| Total sludge age including SBR (days) | 98.97 | 44.60 | 123.88 | 54.49 |  |
| Pounds sludge destroyed | 265 | 318 | 491 | 615 |  |
| % sludge reduction | 51 | 28 | 59 | 33 |  |
| Thickened, digested sludge (gpd) | 2011 | 6628 | 2680 | 10096 |  |
| Lbs oxygen/sludge destroyed | 1.42 | 1.42 | 1.42 | 1.42 |  |
| Aeration hours/day | 10 | 10 | 10 | 10 |  |
| SOR/tank (lbs/hr) | 57 | 68 | 52 | 65 |  |
| Clean water efficiency (%) | 25 | 25 | 25 | 25 |  |
| SCFM/tank | 218 | 262 | 202 | 253 |  |
| Air flow per jet | 35 | 35 | 35 | 35 |  |
| Number of jets required per tank | 6.24 | 7.48 | 5.77 | 7.23 |  |
| Number of jets provided | 14 | 14 | 14 | 14 |  |
| Pump horsepower (bhp) | 14.40 | 14.40 | 14.40 | 14.40 |  |
| Blower horsepower (bhp) | 11 | 14 | 11 | 13 |  |
| Mixing energy (hp/MG) | 87 | 95 | 84 | 93 |  |
| Total design equivalent horsepower, BHP | 11 | 12 | 21 | 23 |  |

In the operation of the treatment plant 300, the influent wastewater 306 is introduced into an influent sieve tank 308 containing a spiral sieve 310 of conventional design to remove solid wastewater components. The sieved wastewater flows through manually or automatically controlled stop gate 312 and sluice gate 314, into a generally anaerobic grease and grit trap tank 316, which includes a sludge holding and thickening tank 318, a jet aspirator 320 to permit control of anaerobic condition development, and tank baffles 322, in accordance with conventional design practice. The wastewater from the grit and grease trap tank 316 is introduced into the surge anoxic mix tank 324 through conduit 326, which positions the influent wastewater toward the bottom of the tank 324 for odor control. The surge anoxic mix tank 324 is also provided with a linear array of motive jet mixers 326 for mixing the liquid and treatment cultures in the tank. The jet mixers are powered by a 15 horsepower motive jet pump 328 having an intake within the surge anoxic mix tank 324. The mixed liquor wastewater undergoing treatment in the surge anoxic mix tank 324 may be pumped to either or both of the sequencing batch reaction tanks 330, 332. best shown in FIG. 5, which is a cross-sectional view of the surge anoxic mix tank 324 and the sequencing batch reaction tank 330, a motive pump 332 with an intake positioned within the surge anoxic mix tank 324 is utilized to power a linear array 336 of jet aerators, such as model F2JA jet aerators of Fluidyne Corporation positioned within the sequencing batch reaction tank. Pressurized air is also provided to the jet aerators by means of blowers 338 (FIG. 3) and appropriate aerator piping 340. Mixed liquor return weirs 342 (FIG. 3) are also positioned with their intakes at a predetermined top SBR tank water level, corresponding to the "filled" condition in the sequencing batch reaction tank 330. These waste liquid weirs and conduits for returning mixed liquor from the aeration tank to the anoxic mix tank are important in providing interaction between the aerobic wastewater in the SBR tank 330 and the surge anoxic mix tank 324, as previously described.

The SBR treatment tank comprises means for mixing the wastewater liquids in the tank, and for aerating the liquids in the tank. In the illustrated embodiment, the mixing and aerating functions are carried out by jet aeration apparatus 120, which comprises a wastewater pump 122 for introducing a pressurized stream of wastewater drawn from the anoxic mix tank, into a wastewater manifold of the jet aeration mixer. Pressurized air may be introduced into a pressurized air manifold of the jet aeration mixer by means of a blower in accordance with conventional practice. The pressurized liquid and the air may be combined and discharged into the tank 330 through a plurality of nozzles, which in the illustrated embodiment are regularly disposed at uniform intervals along the pressurized fluid and pressurized air manifold. The pressurized liquid or pressurized liquid and air stream which is discharged from the nozzles, is directed toward the opposite wall of the tank, and may be directed downwardly at a slight angle in order to sweep across the bottom of the tank 102 to thoroughly mix the tank.

The SBR tank 330 accordingly includes solids excluding decanters 342 such as model SED18 decanter of Fluidyne Corporation having capacity for 2500 gpm each for withdrawing clarified, treated effluent from the SBR tank to an effluent discharge channel 344, where it may be filtered, disinfected, and returned to the environment as a highly purified water stream.

The hydraulic retention time of the surge anoxic mix tank for typical domestic sewage treatment may desirably be in the range of from about 2 hours to about 8 hours, while the aerobic sequencing batch aeration tank(s) may desirably have a hydraulic retention time of from about 4 to about 16 hours, with a total hydraulic retention time (based on the average daily influent flow rate) in the range of from about 6 to about 24 hours for the total surge anoxic mix and aerobic treatment tank volume. Preferably, the HRT will be less than 20 hours, and more preferably, less than 18 hours, such that the total tankage volume may be less than the total daily treatment volume to be handled by the plant. For example, for a wastewater treatment system designed to treat 2,400,000 gallons of wastewater per day, having an HRT of 16 hours, the treatment volume of the surge anoxic mix and aerobic sequencing batch reactor tanks may have a volume of approximately 1,600,000 gallons, so that the hydraulic retention time is approximately 16 hours. Because the solids are retained within the treatment basin for an extended treatment time, the solids retention time (SRT) is substantially greater than the hydraulic retention time (HRT).

In accordance with conventional practice in the operation of sequential batch reactors, the wastewater solids sludge may be periodically recovered by removal from the bottom of the anoxic mix and/or aerobic treatment basin by a suitable piping system (not shown). In addition, however, the solids, including culture microorganisms may be transferred from the aerobic and/or anoxic treatment tanks to the anaerobic trash trap 316 for total solids reduction, and enhanced phosphate removal as previously discussed. Such recovery or transfer from the anoxic mix tank may be carried out in small amounts with each treatment cycle, or larger amounts at more extended intervals. When phosphate removal is enhanced by transferring wastewater solids to the anaerobic zone, which are at least in part subsequently introduced into the anoxic zone, it is preferred to remove the high phosphate sludge from the anoxic or aerobic zone, rather than the anaerobic zone.

At the discharge end of the sequencing batch reactor 330 there is provided a submerged discharge manifold solids excluding decant system 300 such as described in U.S. Pat. No. 4,596,658, which is utilized to periodically remove a predetermined amount of clarified water from the treatment basin 330.

In operation, as the surge anoxic mix tank reaches the control water level (CWL), wastewater from anoxic mix tank is pumped to fill SBR1 and continue to overfill (interact), while cycling feed pump based on time and/or DO and/or $NO_3$ levels in the SBR and surge anoxic mix tanks, until the surge anoxic mix tank control water level CWL is reached again.

The feed to SBR1 is then stopped, and the settle timer for SBR1 is started while the SBR1 is maintained in quiescent condition for clarification of the upper decant zone. The feed from the surge anoxic mix tank is started to SBR2 and continue as described for SBR1 above.

When the settle timer for SBR1 times out, the decant cycle for SBR1 is initiated until SBR1 BWL is reached. When the CWL is reached again in the surge anoxic mix tank, the cycle is repeated.

Figure 6:
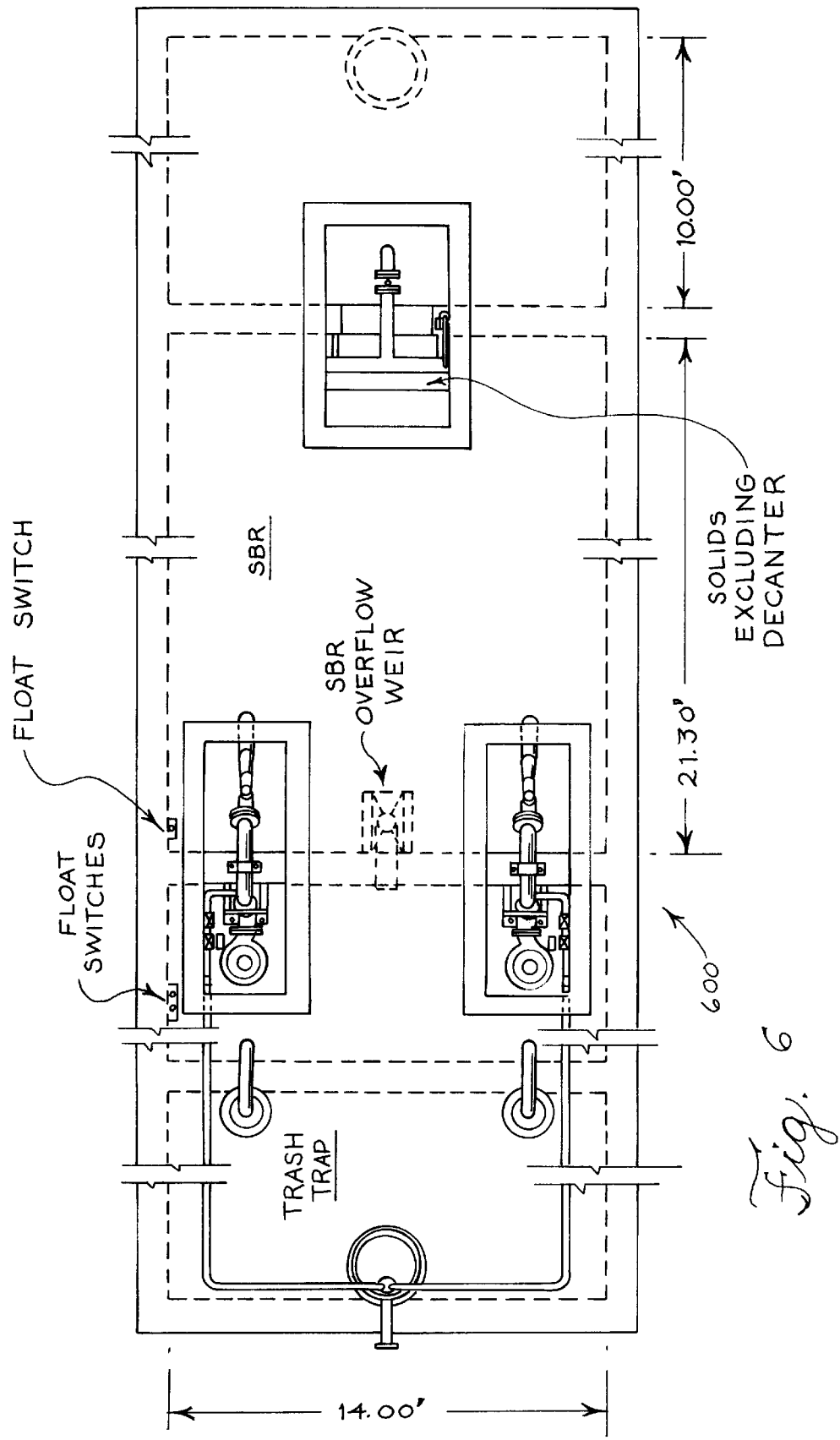
FIG. 6 is a plan view of another embodiment of a sequencing batch reactor system of compact design in which a single surge anoxic mix chamber interacts with a single sequencing batch aeration and decanter chamber.
Figure 7:
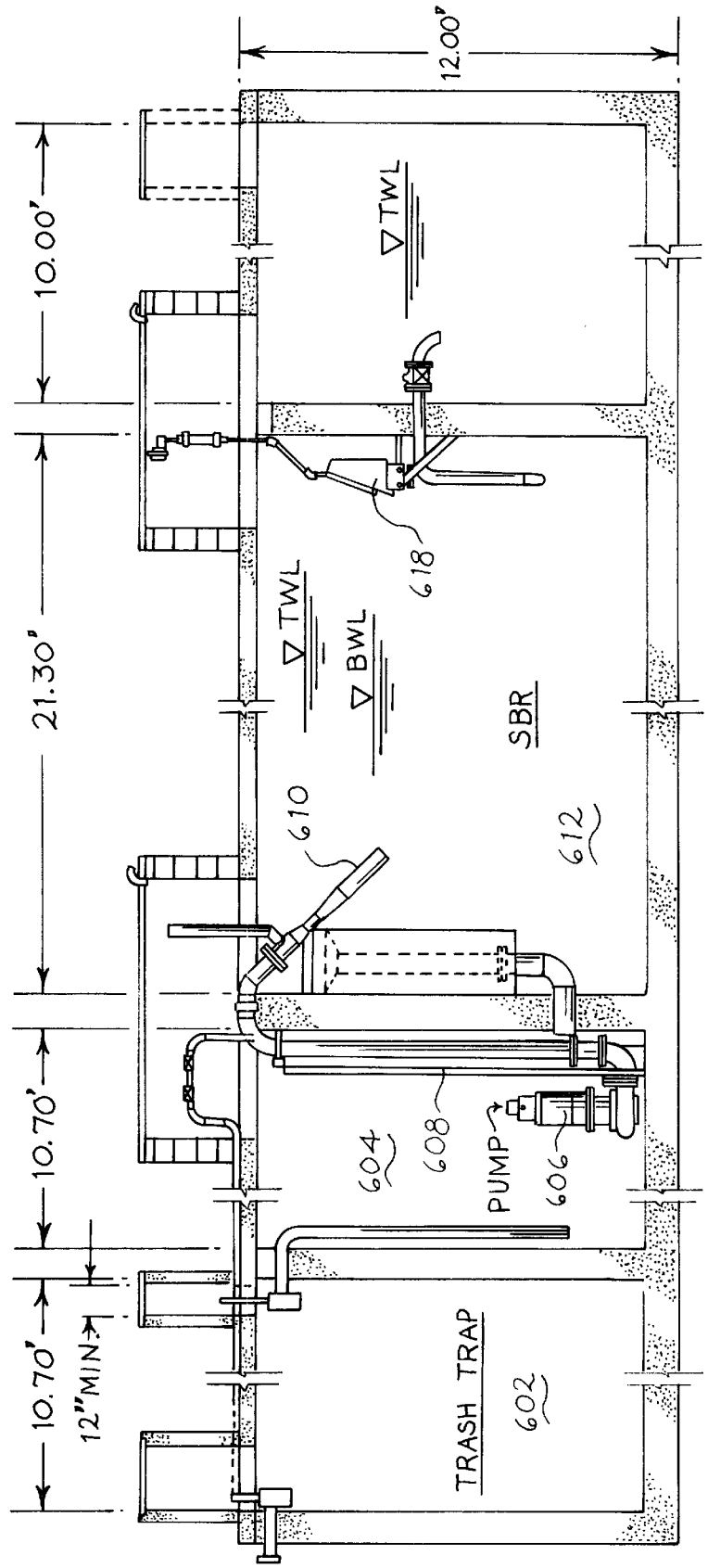
FIG. 7 is a cross sectional view of the sequencing batch reactor system of FIG. 6 taken through line A—A.

Illustrated in FIGS. 6 and 7 is an additional embodiment 600 of a relatively compact surge anoxic mix, sequencing batch reactor wastewater treatment system for a relatively small wastewater flow, such as for a resort area of population 200 to 500, or a small office-industrial complex. The design specifications and calculations for the treatment system 600 are set forth in the following Table 3:

TABLE 3

| INFLUENT CONDITIONS | |
|---|---|
| Flow (mgd) | 0.019 |
| Flow (gpm) | 32 |
| BOD (mg/l) | 286 |
| BOD (lb/d) | 45 |
| TSS (mg/l) | 1300 |
| TSS (lb/d) | 206 |
| TKN (mg/l) | 163 |
| TKN (lb/d) | 26 |
| OXYGEN REQUIREMENTS | |
| Lbs. TKN required for synthesis | 2.27 |
| Lbs. NO3-N produced | 24 |
| Lbs. 02 recovered/lb NO3-N reduced | 2.6 |
| Lbs. Oxygen/lb. of BOD | 1.4 |
| Lbs. Oxygen/lb. TKN | 4.6 |
| Actual Oxygen Demand (lb 02/d) Total | 111 |
| Alpha | 0.9 |
| Beta | 0.95 |
| Theta | 1.024 |
| Operating Dissolved Oxygen (mg/l) | 1 |
| Clean Water Oxygen Sat. at Op. Temp (Mg/l) | 10.07 |
| Clean Water oxygen sat. at Std. Temp (mg/l) | 9.09 |
| Clean Water 02 sat, std temp, mid depth (mg/l) | 10.49 |
| Std. condition ambient pressure (psia) | 14.7 |
| Oper. condition ambient pressure (psia) | 11.65 |
| Wastewater temperature (c) | 15 |
| SOR/AOR ratio | 1.69 |

TABLE 3-continued

INFLUENT CONDITIONS

| | |
|---|---|
| Standard Oxygen Demand (lb 02/d) total | 187 |
| Standard Oxygen Demand (lb/02/hr) | 15.44 |
| Specific oxygenation rate (mg/l-hr) | 53 |
| Lbs. of oxygen/lb. of air | 0.23 |
| Clean Water Efficiency (%) | 15 |
| Lbs. of Air/Cubic Ft. of air | 0.075 |
| Aeration hours per day | 12.12 |
| Air flow rate (SCFM/tank) | 99 |

NITRIFICATION/DENITRIFICATION

| | |
|---|---|
| Required alkalinity for nitrification (mg/l) | 1062 |
| Alkalinity recovered, denitrification (mg/l) | 446 |
| Net alkalinity required (mg/l) | 616 |
| Mixed liquor temperature, C. | 15 |
| ML dissolved oxygen (mg/l) | 1 |
| Max. nitrifier growth rate, day-1 | 0.204 |
| Minimum SRT required for nitrification, days | 4.89 |
| Actual or Design SRT, days | 83.63 |
| Kn, half velocity constant (mg/l) | 0.40 |
| Design growth rate for heterotrophs/nitrifiers | 0.0120 |
| Projected effluent soluble NH3-N, mg/l | 0.03 |
| Specific utilization rate, lbs BOD5/lb mlvss | 0.11 |
| lbs. mlvss required for BOD & NH3 removal | 402 |
| mlvss (mg/l) | 3250 |
| Tank volume req. for BOD & NH3 removal (MG) | 0.015 |
| Aerobic hrs/day required, hr. | 10.12 |
| Denitrification rate (g/g/day) | 0.043 |
| lbs mlvss required for denitrification | 551 |

INFLUENT CONDITIONS

| | |
|---|---|
| Tank volume required for N03 removal (MG) | 0.020 |
| Anoxic hrs/d required/hr. | 13.86 |
| Anoxic mix hrs/d | 9.69 |
| Total tank volume required (MG) | 0.0352 |
| SBR Tank Configuration | |
| No. of tanks | 1 |
| Length overall (ft) | 32 |
| Length Surge Anoxic Mix tank (ft) | 0.70 |
| Length SBR tank (ft) | 21.30 |
| Width (ft) | 14 |
| Bottom water level (ft) | 8.4 |
| Top water level (ft) | 10.5 |
| Top of Wall (ft) | 12 |
| No. decanters/tank | 1 |
| Total tankage volume a TWL(MG) | 0.0352 |
| HRT (hrs) | 44.45 |

CYCLE TIMES/CAPACITY CALCULATIONS

| | |
|---|---|
| Total Decant Volume (cubic feet) | 626 |
| Total Decant Volume (gallons) | 4,684 |
| Decant volume per tank (gallons) | 4,684 |
| Number of cycles per day/tank | 4.06 |
| Total time per cycle (minutes) | 355 |
| Fill rate (gpm) | 742 |
| Fill time (minutes) | 6.31 |
| Interact period (min) | 287 |
| Settle period (minutes) | 50 |
| Average decant rate (gpm/ft decanter) | 100 |
| Decanter length (feet) | 4 |

INFLUENT CONDITIONS

| | |
|---|---|
| Decanting time (minutes) | |
| Decanting rate (gpm) | 400 |
| Peak decanting rate (gpm at start of decant) | 440 |
| Idle period time (minutes) | 0 |
| Zero idle & react time, flow rate (MGD) | 0.109 |
| Peak/average flow | 5.762 |
| Maximum aeration period available (hours/day) | 19.83 |

EQUIPMENT SELECTION

| | |
|---|---|
| Air flow per nozzle (scfm) | 100 |
| Number of nozzles required (per tank) | 0.99 |
| Number of nozzles provided (per tank) | 2 |
| Actual airflow per nozzle required (scfm) | 49.74 |

In the treatment system 600, the influent wastewater to be treated is continuously introduced into trash trap tank 602, which is generally in an anaerobic condition with facilitative anaerobes predominating in the tank 602. The influent flows from the trap tank 602 to the anoxic mix tank 604 having a nominal (filled) volume of 20,000 gallons, which contains two motive pumps 606 of 10 horsepower each, with a fluid intake near the bottom of the tank 604. Each motive pump output is directed through conduit 608 to a jet aspiration aerator 610 (Fluidyne Corporation Model FJASQ4 which is directed into the sequencing batch reaction aeration tank 612, which has a nominal (filled) volume of 35,000 gallons. The aeration tank also has an overflow weir assembly 616 which drains mixed liquor at a top water level (here 10.5 ft) back into the anoxic mix tank as most clearly shown in FIG. 7. The SBR aeration zone also includes a decanting system 618 such as the Fluidyne SED6 Decanter, which is adapted to remove a predetermined portion of an upper clarified layer and removed from the treatment zone by withdrawing clarified water through a decanting orifice which is oriented horizontally along its length in the treatment zone. The decanter 618 functions, when operated to drain the aeration tank from its top water level of 10.5 feet, to its bottom water level of about 8.4 feet.

The decanting step may be controlled by opening and closing a single valve in the decanter 618 and permitting hydraulic pressure to force the clarified liquid through the horizontally extended decantation orifice. The decantation step may be initiated by removing the air from the fluid trap zone to establish a continuous liquid column in the hydraulic trap zone. The treated decanter 618 outflow is directed to an effluent discharge chamber 620, from which it may be further filtered, disinfected, and discharged to the environment.

As also indicated, various apparatus aspects of the present invention comprise a sequential batch reaction tank, and tank inlet means for introducing wastewater to be treated into the tank, together with horizontally extended decantation means for withdrawing liquid from the tank positioned within the tank at a predetermined height substantially corresponding to a minimum predetermined water level decantation height.

Aeration and other biological treatment tanks, including continuous systems, sequencing batch reactors, and surge anoxic mix treatment systems such as those of FIGS. 1–7, may have problems of foam and scum accumulation on the surface of the tank contents. Foam is typically present at start up of the biological process. During aeration, surfactants contained in the influent wastewater will produce foam until sufficient bacteria growth and biological activity biodegrade the surfactants, to a degree sufficient to suppress foam generation. As the wastewater treatment bacteria grow and age, scum may accumulate on the tank water surface. This scum typically consists of bacteria and other biological growth such as nacardia and other antinamycetes or fungi. Other floatables such as plastics and paper may be incorporated in the scum. The scum is unsightly and can be a source of odor. Scum can also interfere with proper operation of mechanical equipment such as decanters, clarifiers, and sludge holding and processing tanks and equipment.

Though there are a variety of commercially available or custom made scum skimmers, they have proven less than fully effective in removing scum. This is especially true in aeration tanks where scum skimmers typically only remove the scum from a limited surface area at any one time, involve limited wastewater removal with the scum, and are affected by wind and wave action.

Figure 10B:
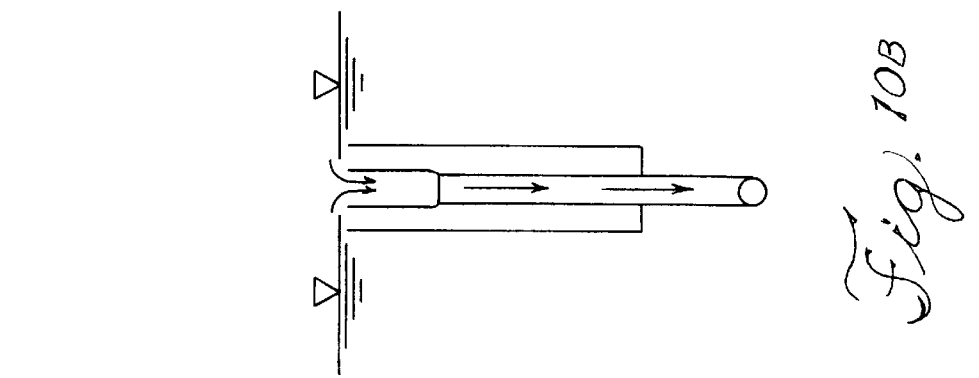
FIG. 10B is a plan view of the device of FIG. 9 during the interact step of a surge anoxic mix treatment system.
Figure 9:
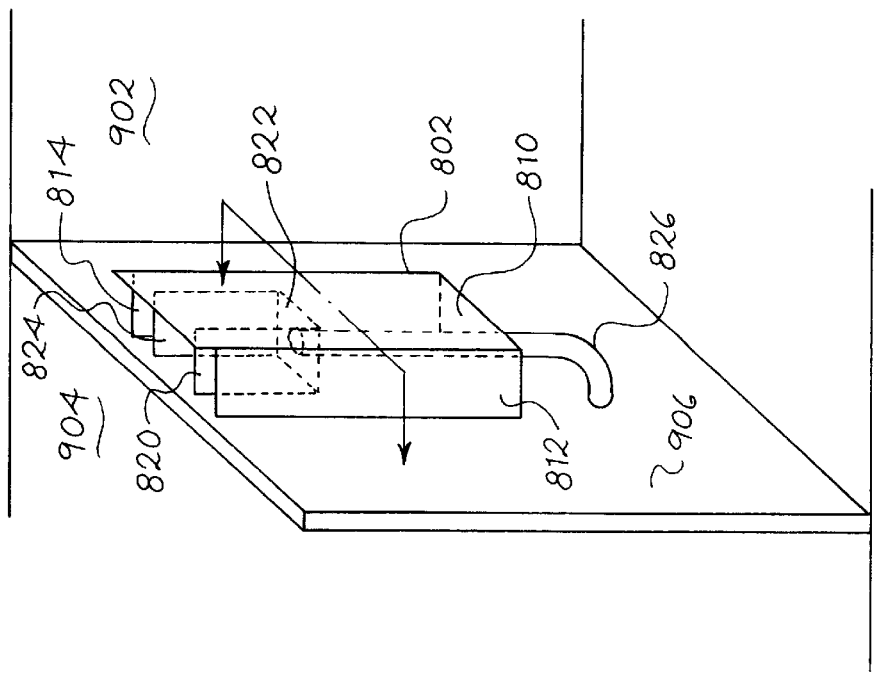
FIG. 9 is a perspective view of the flow baffling and quiescent diffusion apparatus of FIG. 8.
Figure 10A:
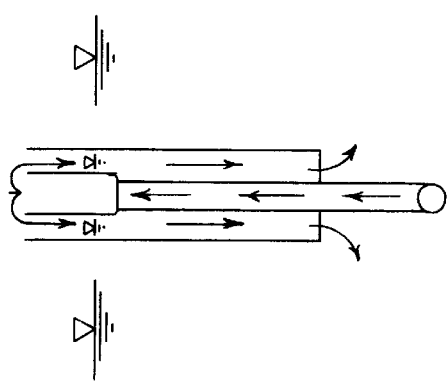
FIG. 10A is a plan view of the flow baffling and quiescent diffusion apparatus of FIG. 9 during high flow conditions during a decant step in the operation of a surge anoxic mix wastewater treatment system.

Certain aspects of preferred systems in accordance with the present invention are directed to more complete and effective scum removal. FIG. 8 schematically illustrates an appropriate weir assembly 802 disposed to control flow between an aerobic treatment zone 806 and an anoxic treatment zone 804 of a surge anoxic mix treatment system such as shown in FIGS. 1–7. Schematic views of both an interact phase of a treatment cycle (in which fluid is introduced from the anoxic mix zone 804 into aerobic treatment zone 806 while fluid overflows from the zone 806 back into the zone 804), and a decant phase of a treatment cycle (in which fluid from the anoxic mix zone 804 is introduced into the quiescent aerobic treatment zone 806 without substantial mixing), are shown in FIG. 8. As indicated in FIG. 8 together with FIGS. 9, 10A and 10B, by overflowing tank contents through a multi-purpose flow and scum controller 802, foam and scum may be effectively removed from the tank and concentrated in another tank. By proper weir arrangement as depicted in FIGS. 9–10, rising water can be caused to overflow the weir at a substantial rate carrying scum and other floatables into a separate concentrating and holding tank, or to an "upstream" zone of the treatment process. If directed to an upstream treatment zone, the scum will be subjected to further biological treatment. If directed to a separate holding tank, the scum breaks down under long term biodegradation, eliminating further treatment of the scum. Nonbiological or inert material incorporated with or skimmed with the scum can then be easily removed in any appropriate manner, such as by separate drain or suction systems. The hydraulic head available from the overflowing tank contents may be used to mix the concentrating and holding tank. A similar set of overflow weirs may also be used to contain and diffuse high flow passing through the tank combination. Flow exits the holding tank beneath the scum layer in reverse flow fashion and enters the skimmed tank through a diffusion shroud so as not to disturb the tank during settle and decant operations.

A weir assembly 802, which serves as a fluid transfer mechanism between an aerobic treatment zone 902 and an anoxic treatment zone 904 separated by wall 906, is shown in FIG. 9. The weir assembly 802 comprises an outer flow baffle consisting of a first baffle 810 which is parallel to the tank wall 906, two side external baffles 812, 814 which join the parallel baffle 810 to the wall 906, an internal flow baffle consisting of baffles 820, 822 and 824 which form an internal U-shaped enclosure, and a conduit 826 extending from the bottom of the U-shaped enclosure, downward, and through the tank wall 906 from the zone 902, to the zone 904. During the settle and decantation phase of the sequential treatment cycle, it is important that the introduction of fluid from the anoxic mix tank or zone, or any other source, not disturb the settled effluent, and not "short circuit" to the effluent outlet stream. In this regard, it is generally not desirable to introduce fluid from an anoxic mix zone into the aeration zone during the settling and decantation portion of the treatment cycle. However, during high influent flow conditions, the treatment capacity of the system may be exceeded, and it may be accordingly necessary to pass through some of the partially treated wastewater in the anoxic zone into the aeration zone, during the settling and decantation phase. As shown in FIG. 10A the weir apparatus 802 effectively accomplishes flow baffling and diffusion under circumstances in which flow may be introduced from the anoxic mix tank to the aeration zone, where the settling and decantation are occurring. As shown in FIG. 10A, when the hydraulic level in the anoxic mix zone exceeds the top of baffle plates 820, 810, 824, the flow introduced by this hydraulic head passes into the shrouded zone formed by baffle plates 812, 810, 814 surrounding the internal baffle and conduit 826. The waste fluid thus is introduced into the aeration zone with a slight downward momentum, into the lower, settlement zone containing the settled solids and bacteria, and away from the upper, clarified zone from which treated, clarified effluent is removed. In this manner, short circuiting of influent and or anoxic mix tank contents is prevented. Baffling, stilling and flow direction are provided, and the influent is diffused into settled sludge to enhance treatment at high flows. Again, with reference to surge anoxic mix treatment systems such as those illustrated in FIGS. 1–7, during the interact phase of the treatment cycle, the weir apparatus 802 performs the scum skimming and mixed liquor recycle functions as previously described. In this regard, during the interact phase, waste liquid from the anoxic zone is introduced into the aeration zone until the hydraulic level in the aeration zone reaches the top level of the weir 802. This is accompanied by concomitant lowering of the hydraulic level in the anoxic mix zone (after also accounting for influent wastewater). As shown in FIG. 10B, when the hydraulic level in the aeration tank reaches the top of the weir formed by the baffles 820, 810, 824, the wastewater at the surface of the aerobic zone adjacent the weir, including any scum and/or foam, is transferred down the conduit 826, through the wall 906, and into the adjacent anoxic mix zone. As wastewater continues to be pumped into the aeration zone (through a separate pump as previously described), the surface liquid, and any surrounding scum, surface debris and/or foam continue to be transferred to the upstream anoxic mix zone, for continued treatment.

As indicated, some embodiments of the present disclosure are also directed to integrated wastewater treatment systems which have reduced levels of sludge production, and/or independent or "stand-alone" systems in which wastewater biological treatment sludge is treated to reduce its volume and bulk, particularly including its organic content. Thus, the sludge reduction capabilities described herein can be integrated in the design of the previously described surge anoxic mix, tilt, sequential batch reactor, wastewater treatment systems. In such systems, the influent wastewater to be treated is introduced into an anaerobic treatment zone, where at least a portion of the total suspended solids of the influent wastewater is settled to an anaerobic settled solids zone in the lower portion of the anaerobic treatment zone. Waste liquor from the anoxic and/or aerated treatment zones containing microbial sludge produced by the anoxic and aerobic treatment processes is recycled to the anaerobic treatment zone, wherein at least about 50 percent by weight of the microbial sludge and other solids content (TSS) of the waste liquor recycled to the anaerobic zone is settled to the anaerobic settled solids zone in the lower portion of the anaerobic treatment zone together with settled influent wastewater solids. Under the anaerobic digestion conditions, the mixture of the settled mixture of the raw influent solids and the recycled microbial sludge solids is anaerobically digested. Typically at least about 50 percent by weight of the influent organic solids and the recycled microbial solids which settle in the settled solids zone arc anaerobically biologically digested to produce anaerobically digested solid, soluble and gas components in the anaerobic treatment zone. Wastewater from the anaerobic treatment zone, which includes both influent wastewater and recycled waste liquor wastewater, is conducted from the anaerobic zone to the anoxic zone, and carrying with it the soluble anaerobic digestion components for anoxic biotreatment in the anoxic zone, and aerobic biotreatment in the aerobic treatment zone, Similarly, independent systems for treatment of sludge from independent biotreatment or sludge treatment systems, such as aerobic or anaerobic digesters or activated sludge systems, can be provided in order to reduce the amount of sludge, from such digesters or other sludge source, which must be disposed of by landfill or longer-term treatment processes. As examples of such integrated sludge-reduction systems and independent sludge reduction systems, illustrated in FIGS. 11–14 are systems which integrate anaerobic, anoxic, and aerobic processes for raw sewage treatment and/or for sludge management, reduction, art and consumption or destruction. Such systems of should be capable of reducing the amount of organic sludge for ultimate disposal by 80% or more, by weight, as compared to the sludge produced in the absence of such features. In this regard, the amount of organic sludge conventionally produced prior to aerobic or anaerobic digestion will typically be about 0.4 to about 0.8 grams per gram of BOD5 in the influent wastewater to be treated. The system of the present disclosure utilizing anaerobic/anoxic sludge recycle will preferably reduce the amount of organic sludge produced by the system to less than about 0.2 grams of organic sludge per gram of influent BOD5, and preferably less than about 0.1 grams of organic sludge per gram of BOD5.

Figure 12A:
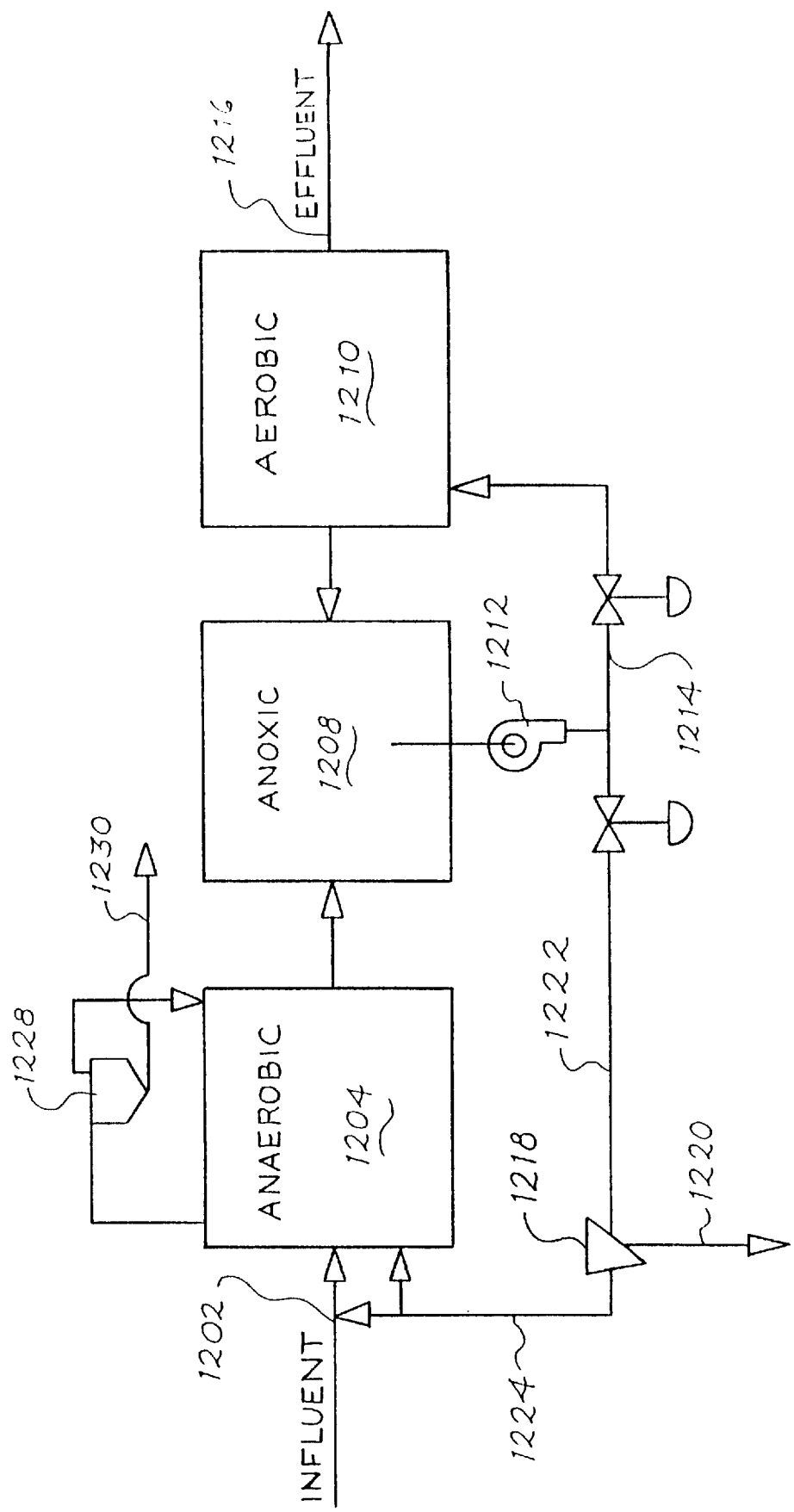
FIGS. 12A, and 12B represent, respectively, schematic flow diagrams of integrated surge anoxic mix systems with recycling anaerobic sludge reduction.
Figure 12B:
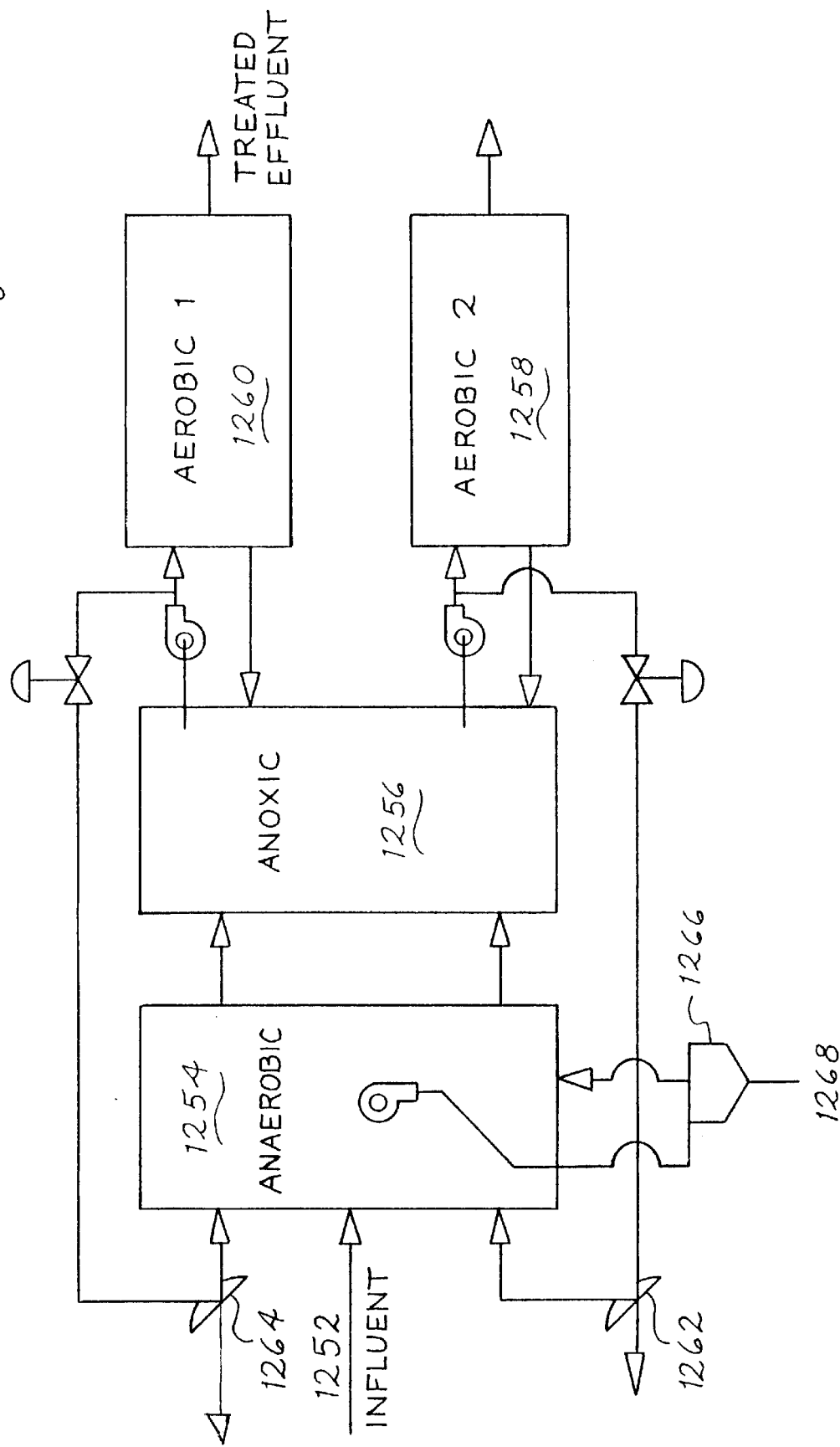
Figure 12D:
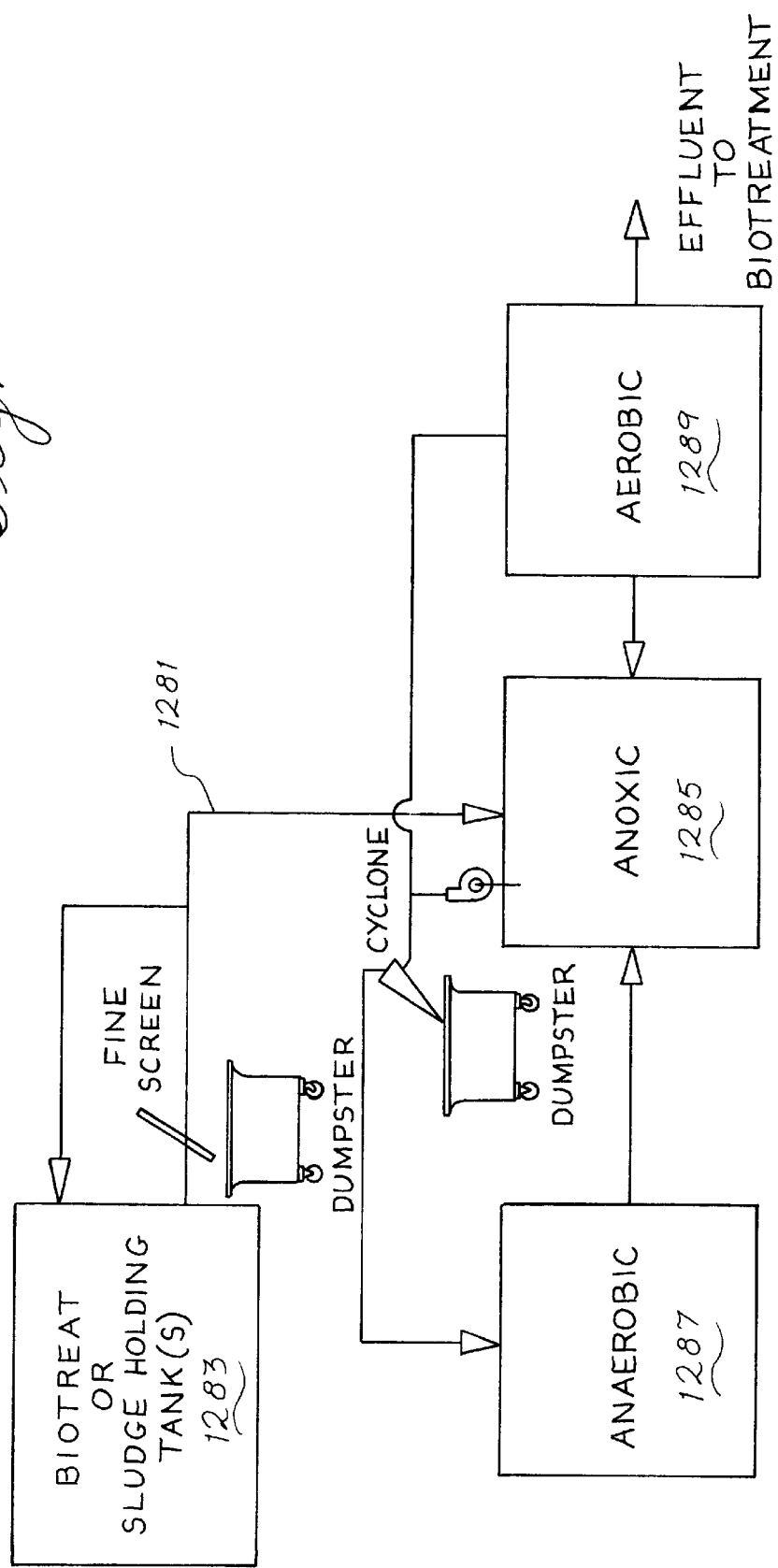
Figure 13:
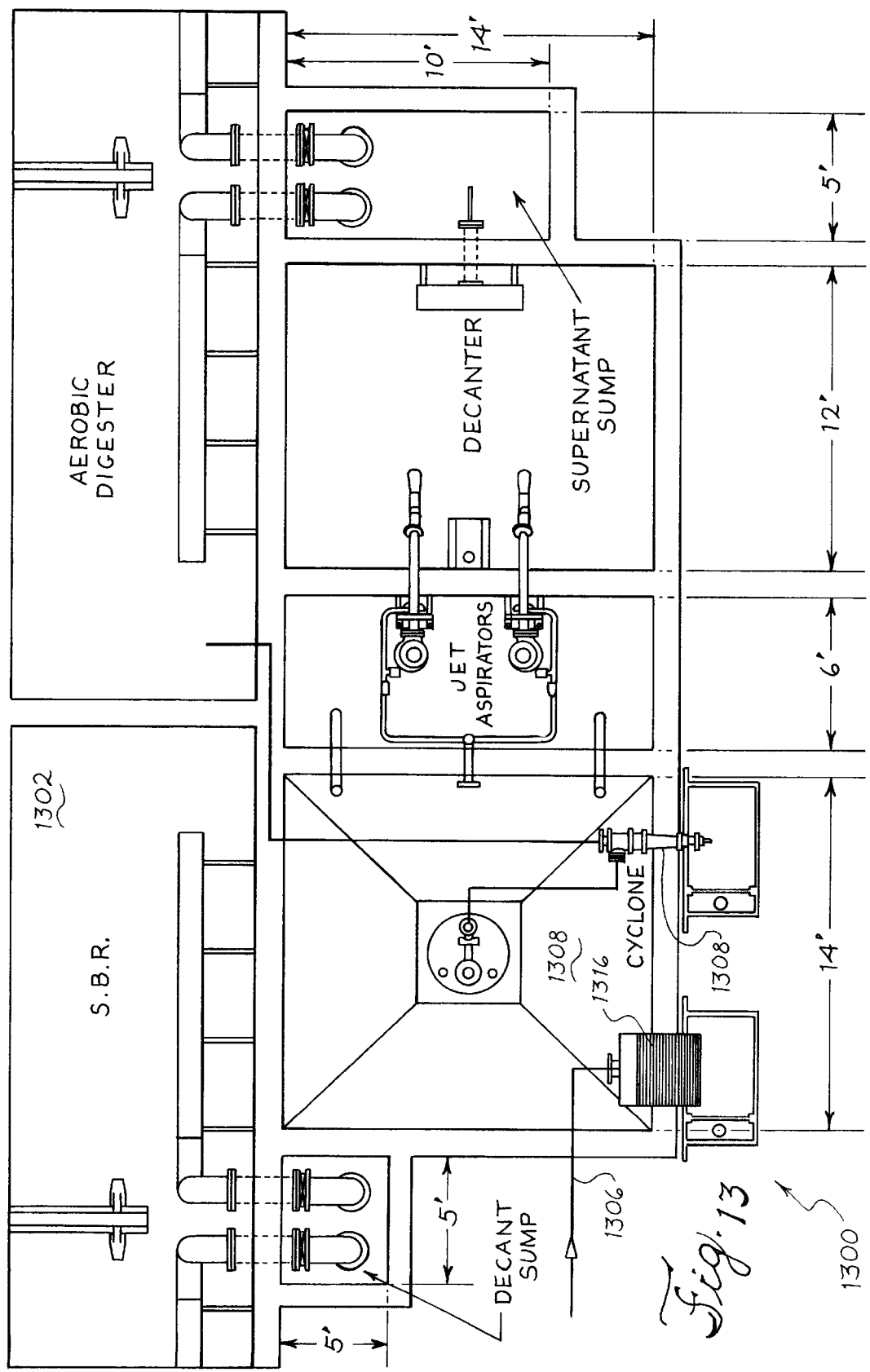
FIG. 13 is a cross sectional side view of a sludge reduction system useful in flow processing designs such as those of FIG. 12.
Figure 14:
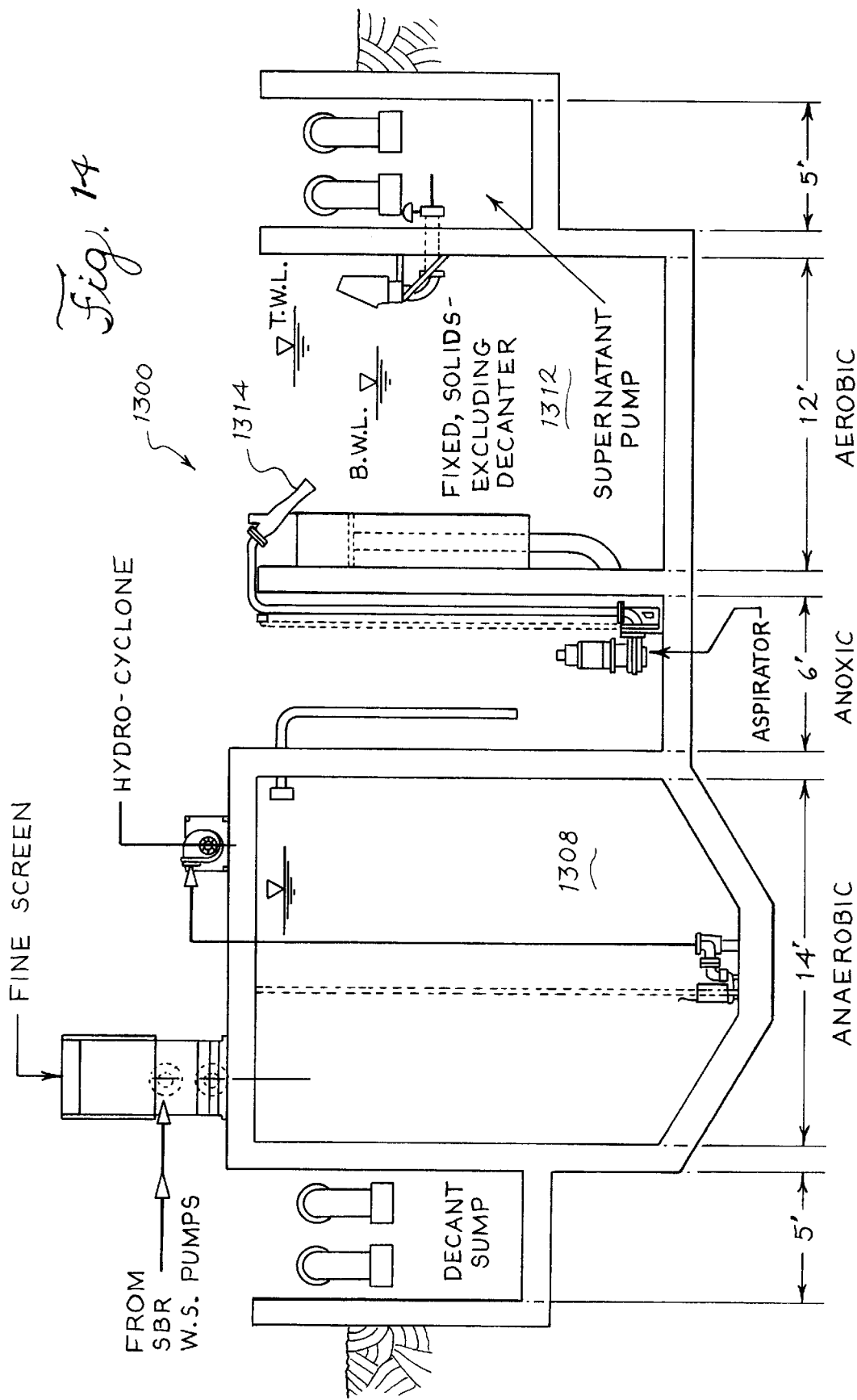
FIG. 14 is a top view of a sludge reduction system useful in flow processing designs such as those of FIG. 12.

In systems such as illustrated in FIGS. 11–14, raw or pretreated sewage is introduced into a first anaerobic zone, which can correspond to trap zone 316 of the system of FIG. 3, or the trap zone 602 of the system of FIG. 6. The anaerobic zone is unmixed or lightly mixed such that inorganic and fast-settling organic solids settle to the bottom of the zone and are concentrated at the bottom of the zone. Settled and unsettled organic solids undergo anaerobic digestion, consuming organic components and producing products of anaerobic digestion such as carbon dioxide, methane, ammonia, hydrogen sulfide, and organic intermediates or breakdown products. Many of these anaerobic digestion products are soluble and pass with the liquid phase into the next anoxic/aerobic zone, and subsequent microbial treatment under respective anoxic and aerobic conditions as previously described. Some of the byproducts are volatilized and pass into the gas phase. The off-gas can be treated for odor control as required (see FIG. 14 showing a covered anaerobic treatment tank), in accordance with conventional practice, such as by passage or filtration through a basic absorbent. The surface loading rate of the anaerobic zone is preferably from about 100 to 1000 gallons/ft$^2$/day (4 to 40 M$^3$/M$^2$/day). The organic loading rate is preferably from about 60 to 300 pounds/1000 ft$^3$/day (1 to 5 kg/M$^3$/day).

Figure 11A:
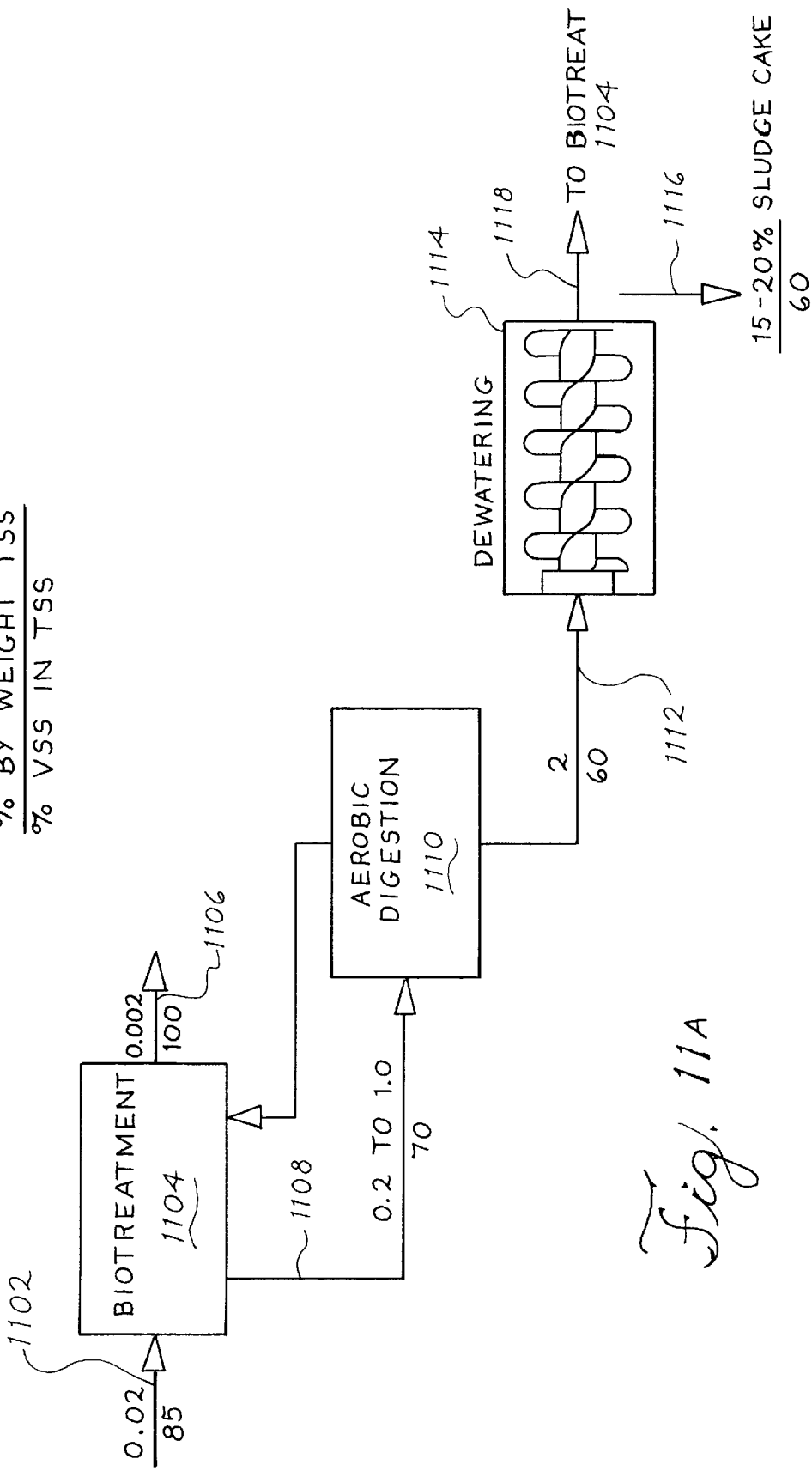
FIG. 11A is a schematic flow diagram depicting a typical solids balance for a conventional wastewater treatment system.
Figure 11B:
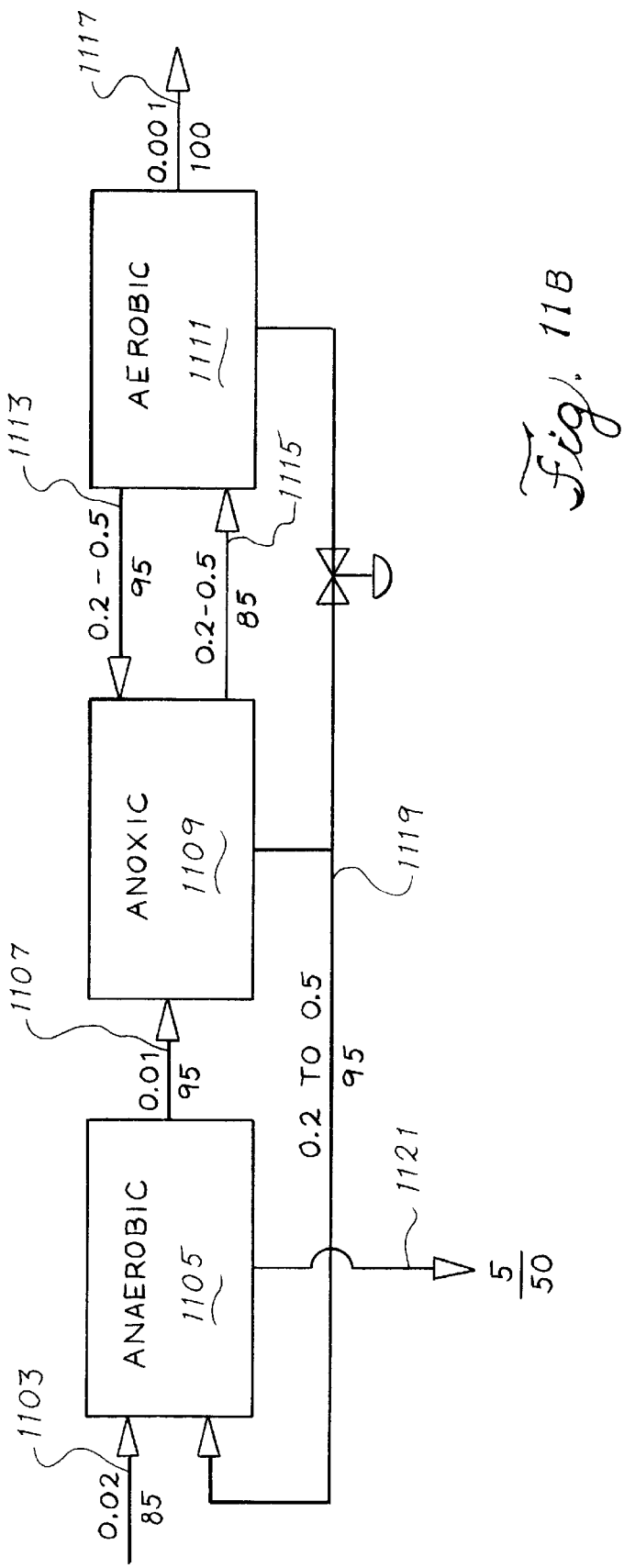
FIG. 11B is a schematic flow diagram depicting a solids balance for certain embodiments of systems in accordance with the present disclosure.

Wastewater flow passing through the anaerobic zone carries solids, organics, and nitrogen-containing compounds on to subsequent treatment in anoxic and aerobic zones as previously disclosed, and as shown in FIGS. 11B and 12. The waste sludge produced in anoxic and/or aerobic zones is recycled to the anaerobic zone for further digestion. Organic solids in the anaerobic zone, are continuously degraded and consumed as previously described, washed of organics or elutriated by the flow through the anaerobic zone, leaving the heavier inorganic solids in the anaerobic zone. The heavy inorganic solids concentrate at the bottom of the anaerobic zone with the biologically more inert organics, where they will continue to slowly be degraded by anaerobic processes, and can periodically be removed. Unlike pure aerobic digestion, however, higher solids concentration is possible by use of systems in accordance with the present disclosure. At 80% VSS reduction and 5% residual solids concentration, only 2,000 gallons of residual solids per day are left for disposal from the previously discussed example of a hypothetical 1 MGD plant. This amounts to only about 0.2% of influent flow. Illustrated in FIG. 11A is a typical solids balance for "conventional" wastewater treatment. As shown in FIG. 11A, influent wastewater 1102 typically comprising 0.02 percent by weight total suspended solids (TSS), of which about 85 percent of the total suspended solids may typically be volatile suspended solids (VSS). The remaining 15 percent of the total suspended solids is inert, non-biodegradable inorganics or other fixed suspended solids (FSS). The influent wastewater 1102 is processed by the biotreatment system 1104 to produce treated effluent 1106, in which the total suspended solids is reduced to about 0.002 percent by weight, which is substantially 100 percent volatile suspended solids (VSS). In this regard, substantially all of the inert, inorganic or otherwise fixed suspended solids (FSS) are removed from the treated effluent stream 1106 by conventional biotreatment. The biotreatment system 1104 also produces a waste sludge stream 1108 which may typically comprise about 0.2 to about 1 percent total suspended solids, of which about 70 weight percent is volatile suspended solids, and the remaining 30 percent is the inorganic, inert, fixed suspended solids of the influent wastewater stream 1102. Typically, the biotreatment waste stream is subjected to aerobic digestion in an aerobic digestor 1110 to farther reduce pathogens and volatile suspended solids content. The sludge stream 1112 from the aerobic digestor will typically have a relatively higher total suspended solids content of about 2 weight percent, of which about 60 percent is still undigested volatile suspended solids, the remaining 40 percent being the fixed suspended solids content of the original influent stream 1102. The sludge stream 1112 from the aerobic digestor 1110 will conventionally be dewatered by centrifuge or other suitable dewatering system 1114 to produce a sludge cake 1116 containing about 15–20 percent total solids, of which about 60 percent by weight remains as volatile suspended solids content. This sludge cake 1116 requires disposal and/or subsequent treatment, as previously described. The water stream 1118 separated by the dewatering system may be reintroduced into the biotreatment system 1104, as is the clarified effluent from the aerobic digester 1110.

Sludge reduction systems of the present disclosure can provide considerable reduction in the solids which are produced by a wastewater treatment system, as illustrated by FIG. 11B, which is a typical solids balance for sludge reduction systems utilizing recycling anaerobic treatment of the wastewater sludge produced by the biotreatment of the influent wastewater. As illustrated in FIG. 11B, the influent wastewater stream 1103 will similarly typically comprise about 0.02 percent by weight total suspended solids, of which about 85 percent of such total suspended solids may typically be volatile suspended solids components. Again, the remaining 15 percent of the total suspended solids of the influent wastewater stream 1103 is inert, non-biodegradable inorganics or other fixed suspended solids. In the recycling anaerobic system of FIG. 11B, the influent wastewater stream 1103 is introduced into an anaerobic treatment zone 1105. In the anaerobic zone 1105, the influent wastewater (and other sludge components introduced into the anaerobic zone, as will be more fully described) is subjected to anaerobic degradation, which produces low molecular weight soluble and volatile components such as carbon dioxide, methane, ammonia and hydrogen sulfide, together with soluble organic compounds, as previously discussed. The wastewater stream 1107 exiting the anaerobic treatment zone 1105 may typically comprise about 0.1 percent total suspended solids, of which about 95 percent is volatile suspended solids, and only 5 weight percent is fixed suspended solids. The anaerobic effluent stream 1107 is introduced into the anoxic treatment zone 1109, and from their into an aerobic treatment zone 1111 of a surge anoxic mix, sequencing batch reactor system such as previously described. Because of the retention of wastewater treatment organisms in the sequential batch reactors system, the wastewater streams 1113 and 1115, which are sequentially recirculated between the anoxic treatment zone 1109 and the aerobic treatment zone 1111 similarly comprise from about 0.2 to about 0.5 percent by weight of total suspended solids, approximately 95 percent of which is volatile suspended solids. The treated wastewater stream 1117 discharged from the aerobic treatment zone 1111 has approximately only about 0.001 percent total suspended solids, substantially all of which is volatile suspended solids. As indicated, the sludge reduction systems of the present disclosure utilize recycling anaerobic treatment of the sludge produced by the wastewater treatment process. In this regard, a wastewater stream 1119 is conducted from the surge anoxic mix treatment system (from either or both of the anoxic mix tank 1109 or the aerobic treatment tank 1111). It should be noted that the wastewater liquor in the aerobic treatment zone will have a somewhat higher solids content after the decantation step, which produces the clarified effluent by settling the suspended solids. If the stream 1119 is selected from the sediment and liquid remaining at the conclusion of the decantation step from the aerobic treatment zone 1111, the total suspended solids content may be somewhat higher, and the liquid volume necessary to transport this solids content may be somewhat lower. However, this may require a separate pump, and also introduces more aerobic liquor into the anaerobic zone. Preferred embodiments of the system accordingly may involve a continuous recycling of the wastewater liquor from the anoxic treatment zone 1109 to the anaerobic zone 1105. In any event, the total suspended solids content of the wastewater liquor 1119 returned to the anaerobic treatment zone 1105 is typically at least about 0.3 times the amount of the total suspended solids or BOD5 content of the influent water 1103 to the treatment system. Accordingly, the flow rate of the liquor stream 1119 continuously or intermittently recycled to the anaerobic zone 1105 from the anoxic and/or anaerobic zones 1109/1111 will typically be in the range of from about 50/1 to about 1/300 of the influent 1103 flow rate of waste water to be treated. (100–200% more typical) Upon entering the relatively quiescent anaerobic treatment zone 1105, the microbial and other solids content of the recycled liquor 1119 tends to settle to the bottom of the anaerobic treatment tank 1105, where they undergo anaerobic digestion and partial conversion to gases and more soluble components, as previously discussed. Periodically, or continuously, a stream 1121 of relatively high solids content, of from about three to about five percent by weight total suspended solids, of which about half is volatile suspended solids and the remaining half is fixed suspended solids, may be discharged from the anaerobic zone 1105 for further treatment and disposal. It should be noted that the reduction and volatile suspended solids represents a significant economic savings in subsequent treatment requirements. In integrated systems where the sludge reduction step is incorporated in the liquid processing steps, the anaerobic zone volume is typically 20 to 40% of the total anaerobic+anoxic+aerobic volume and is typically set or controlled by the settling requirements and organic concentration of the influent steam. For domestic sewage, the preferred surface loading rate is from about 300 gal/f of anaerobic zone/day to about 606 gal/ft$^2$ of anaerobic zone/day. For industrial wastes having high organic concentrations or separate sludge reduction systems where influent flow is handled in a separate system and organic loading is concentrated in the sludge stream to be treated, the anaerobic zone is typically a larger percentage of total volume. The anaerobic zone volume in this case is typically set to provide an organic loading rate of from about 2 kg BOD5/M$^3$ to about 6 BOD5 kg/M$^3$.

Residual solids may be reduced even further by additional separation processes. Illustrated in FIG. 12 is a surge anoxic mix wastewater treatment system with integrated sludge reduction, provided by waste liquor recycle through anaerobic, anoxic, and aerobic treatment zones. In this regard, the wastewater influent 1202 to be treated is introduced into a relatively quiescent, anaerobic treatment zone 1204, where the influent suspended solids can settle and be anaerobically digested. The effluent 1206 from the anaerobic treatment zone, which contains solubilized organic compounds produced by the anaerobic digestion, is introduced into the anoxic treatment zone 1208, where it undergoes anoxic treatment to consume soluble organic materials and release nitrogen, and is pumped to the aerobic treatment zone 1210 by pump 1212 as an anoxic stream 1214. As previously described, the waste liquor in the aerobic treatment zone 1210 is subjected to periodic aerobic treatment, recycle to the anoxic zone, settling and decantation of a clarified, treated effluent stream 1216. The anoxic 1208 and aerobic 1210 zones are integrated with the anaerobic zone 1204 by recycling of a waste liquor stream 1222 to the anaerobic zone 1204 from the anoxic and/or aerobic zones, as previously discussed, particularly in connection with FIG. 1 IB. In order to concentrate the VSS for biodegradation, a screen 1218 separates relatively larger, solid, inert materials such as pieces of plastic which will not be biodegradable, and removes them as a relatively inert output component 1220. The screened waste liquor stream 1224 is returned to the anaerobic zone as shown in FIG. 12A. In the anaerobic zone 1204, a portion 1226 of the settled solids at the bottom of the anaerobic zone is periodically pumped through a grit separator cyclone 1228, which may be of conventional design such as the model # FHG1 Hydrogrit (™) grit separator of FLUIDYNE Corporation of Cedar Falls Iowa, and is returned to the anaerobic zone in a relatively quiescent manner. The grit stream 1230 which is removed by this treatment will be relatively high in inorganic components such as sand and clay, which are more readily dewatered and disposed of in the landfill than wastewater filter cake. Such separator screen and grit cyclone treatment may be applied at various other streams in the integrated system. The organic sludge VSS components are retained in the system for extended sludge reduction, but excess sludge may be periodically removed in accordance with conventional practice when necessary. A dual surge anoxic mix treatment system like that of FIGS. 2 and 3, with sludge reduction processing design, is similarly shown in FIG. 12B. The wastewater influent stream 1252 is introduced to an unstirred anaerobic treatment tank 1254, which discharges to a single anoxic tank 1256 interacting with two aerobic tanks 1258, 1260. Waste liquor from the anoxic tank 1256 is recycled to the anaerobic tank through screens 1262, 1264 to remove larger, non-biodegradable materials, and the anaerobic solids may be cycled through an inorganic grit separator 1266 to remove FSS 1268, as previously discussed.

For small treatment plants, the anaerobic zone can also be used for pretreatment by trapping trash and grit, and washing them for ultimate disposal. Larger plants may generally utilize separate pretreatment. In this regard, such systems may accordingly have an additional pretreatment tank to which sludge is recycled, and which discharges to the anoxic mix tank. The sludge in the tank may be recycled through a screen and/or cyclone filter to remove inert solids, as described and shown in FIGS. 12–14.

Treatment systems in accordance with the present invention can also be used for treatment and reduction of sludge from existing or separate biotreatment plants. In this application, the preferred embodiment incorporates continuous or periodic sludge screening and inorganics removal, to remove and concentrate inorganics and substantially completely oxidize the remaining organic sludge. As shown in FIG. 12C (Sludge Reduction System, and SRS with inorganic removal), waste sludge or mixed liquor 1282 from the biotreatment plant or sludge holding tanks 1284 may be passed through a fine screen (0.010 to 0.100 slot opening) 1286 and all or part of the screened sludge is introduced into the unstirred anaerobic zone 1288. The balance is recycled to the biotreatment plant and/or aerobic digester 1290. A recycle pump 1292 takes inorganic containing sludge from the anaerobic or anoxic zone and passes it through a cyclone 1294 to continuously remove the inorganics. The fine screen removes bits and pieces of plastics, which may be organic in nature but resistant to biodegradation and therefor may be regarded as being essentially inert. The fine screen may also remove larger inorganic particles. The hydrocyclone may remove inorganic particles as fine as 25 microns in major dimension. The rejects from the screen and hydrocyclone are essentially dewatered with solids concentrations of 50% or more. The continuous removal of inorganics allows additional room for the remaining organic solids in the anaerobic treatment zone 1288, allowing additional processing time and biodegradation. Given adequate time and conditions the organic sludge is ultimately substantially consumed and destroyed. The principal residual products then become the screenings and removed inorganics, which are suitable for collection in dumpsters for ultimate land fill disposal. Since the screenings and inorganic solids have gone through biotreatment, they are relatively stable and unobjectionable for landfill purposes. Similarly illustrated in FIG. 12D is an independent sludge reduction system adapted to use surge anoxic mix sequential batch reaction systems as described herein, to process waste sludge 1281 from conventional biotreatment or sludge holding tank 1283. As shown, the waste sludge may be first screened to separate larger non-biodegradable components such as plastic pieces, for disposal to a portable dumpster or other receptacle, and introduced directly into the anoxic (or anaerobic) treatment tank 1285 of a sludge reduction system also comprising a relatively quiescent anaerobic treatment tank 1287, and an aerobic treatment tank 1289. The waste liquor is recycled through a grit cyclone from the anoxic 1285 and/or aerobic tank 1289 to the anaerobic treatment tank, after clarification of effluent 1292 from the tank (which can be introduced as influent wastewater to a wastewater treatment system). The inorganic grit component is relatively benign for disposal purposes, and its removal permits more efficient bioprocessing of the anaerobic treatment tank, where the inorganic grit would otherwise accumulate. In the independent sludge reduction system of FIG. 12D, the waste sludge 1281 introduced into the system typically has a relatively high solids content (e.g., at least about 0.2% by weight solids), and the system is particularly adapted to reduce the VSS components of the sludge. In this regard, the recycle flow rate of the waste liquor pumped from the aerobic tank 1289 (or the anoxic tank 1285) will typically be at least about 50 percent of the flow rate of waste sludge 1281 introduced into the anoxic (or anaerobic) tank for processing. For municipal wastewater sludge, this recycle flow rate may desirably be in the range of from about 0.5 to about 5 times the influent flow of waste sludge 1281. The anaerobic tank 1287 will typically constitute from about 20 to about 60 percent of the total volume of the anaerobic, anoxic and aerobic tanks 1285, 1287, 1289. Similarly, the anoxic tank 1285 will typically comprise from about 10 to about 40 percent, and the aerobic tank 1289 will typically comprise from about 20 to about 60 percent of the total processing, or tankage, volume of the anaerobic, anoxic and aerobic tanks together, in order to maximize the sludge reduction capability of the system.

Assuming substantially all of the inorganic suspended solids are removed and disposed of at 50% solids content, and that there are 10% residual organic solids at 5% solids concentration, a total of only about 400 gpd of residuals require ultimate disposal from the 1 MOD example above. This is well below 0.1% of influent flow, and represents better than a 10 to 1 reduction in residuals for ultimate disposal as compared to conventional, standard wastewater treatment systems.

Illustrated in FIGS. 13 and 14 is an independent sludge reduction system (SRS) 1300 which is used in conjunction with an adjacent wastewater treatment system (partially shown in FIG. 13) to reduce the total waste sludge output from the wastewater treatment system. As shown in FIG. 13, which is a top view of the SRS system 1300 adjacent a sequential batch reactor tank 1302 of the wastewater treatment system, and adjacent separate conventional aerobic digestor tank 1304 for the wastewater system.

The sludge reduction system 1300 comprises an anaerobic tank 1308, an anoxic tank 1310 and an aeration tank 1312 shown approximately to scale, which are generated as previously described. The aeration tank 1312 is both mixed and aerated by jet aspirators 1314 and can receive and process waste sludge from either or both of the aerobic digester 1304 by appropriately introducing the sludge in the system. In this regard, waste sludge 1306 from the SBR tank 1302 or the aerobic digestor 1301, may be introduced into the covered anaerobic treatment tank 1308 through a screen 1316 which filters out larger, generally inert particles. The screen 1316 may discharge into any of the tanks 1308, 1310, 1312, but preferably the anaerobic or anoxic tank. The heavy settled solids from the bottom of the anaerobic tank 1308, which will typically have high inorganic content, may be pumped through a grit cyclone 1318 for grit removal and return to the anaerobic treatment tank or the aerobic digestor.

While the present invention has been described with respect to particular embodiments of apparatus and methods, it will be appreciated that various modifications and adaptations may be made based on the present disclosure and are intended to be within the scope of the accompanying claims.

What is claimed is:

1. A surge anoxic mix, sequencing batch reaction method for treating wastewater to reduce its solids content, biological oxygen demand (BOD) and nitrogenous content in an overall sequencing batch reaction treatment cycle time of less than 20 hours, comprising the steps of:

providing an anaerobic pretreatment zone, an anoxic waste liquid treatment zone and one or more separate aerobic sequencing waste liquid treatment zones wherein the ratio of the volume of the anoxic waste liquid treatment zone to the volume of the one or more aerobic sequencing waste liquid treatment zones is in the range of from about 0.2: to about 1:1; and wherein the anaerobic treatment zone has a treatment volume in the range of from about 30 percent to about 300 percent of the treatment volume of the anoxic treatment zone;

introducing influent wastewater containing wastewater solids content, BOD and nitrogenous content to be treated into the anaerobic pretreatment zone containing waste solids including treatment microorganisms under anaerobic conditions;

introducing waste water from said anaerobic treatment zone into the anoxic waste liquid treatment zone containing waste solids including treatment microorganisms under anoxic conditions;

introducing wastewater and treatment microorganisms from said anoxic waste liquid treatment zone into the one or more aerobic sequencing waste liquid treatment zones containing waste solids including treatment microorganisms under aerobic conditions;

mixing and aerating the waste liquid in the one or more aerobic sequencing batch aeration treatment zones to reduce the biological oxygen demand of the wastewater and to convert at least a portion of the nitrogenous wastewater content to inorganic nitrate or nitrite components;

introducing and mixing waste liquid and treatment microorganisms from the one or more aerobic sequencing waste liquid treatment zones into the anoxic waste liquid treatment zone at a rate of at least about 0.1 of the total volume of anoxic zone per hour during an interaction time period, to provide nitrate or nitrite oxidizing components from the one or more aerobic sequencing batch reaction treatment zones for the anoxic treatment microorganism metabolism and to convert the nitrate or nitrite components to nitrogen for removal from the wastewater in the anoxic mix treatment zone;

subsequently to said mixing and aeration steps, maintaining the waste liquid in the one or more aerobic sequential batch wastewater treatment zones in a quiescent state without said mixing and aerating, to form in the respective one or more sequencing batch aeration zones, a clarified upper layer and a stratified lower waste liquor layer containing waste solids including treatment microorganisms;

recycling waste solids from the stratified lower waste liquor layer including treatment microorganisms from said one or more aerobic sequential batch waste water treatment zones directly into the anaerobic pretreatment zones or indirectly into the anoxic zone and subsequently into the anaerobic pretreatment zone at a flow rate in the range of from about 50/1 to about 1/300 of the influent wastewater flow rate to the anaerobic treatment zone, wherein at least a portion of the total suspended solids of the influent wastewater to be treated is settled to an anaerobic settled solids zone in the lower portion of the anaerobic treatment zone, wherein at least 50 percent by weight of the microbial and other solids content (TSS) of the waste liquor directly or indirectly recycled to the anaerobic zone is settled to the anaerobic settled solids zone in the lower portion of the anaerobic treatment zone together with settled influent wastewater solids, wherein at least about 10 percent by weight of the organic solids which settle in the settled solids zone are anaerobically biologically digested to produce anaerobically digested solid, soluble and gas components, wherein wastewater from the anaerobic treatment zone which includes both influent wastewater and recycled waste liquor wastewater, is conducted from the anaerobic zone to the anoxic zone, and wherein at least the soluble anaerobic digestion components produced by anaerobic digestion in the anaerobic treatment zone are conducted in the wastewater flow from the anaerobic treatment zone to the anoxic treatment zone for anoxic biotreatment, and to the aerobic treatment zone for aerobic biotreatment; and removing a predetermined portion of the clarified upper layer from the respective one or more sequencing aeration treatment zones as a treated effluent stream having reduced solids content BOD and nitrogenous content with respect to said influent wastewater.

2. A method in accordance with claim 1 wherein said mixing and aerating of the waste liquid in said one or more aerobic sequencing batch aeration treatment zones is carried out for at least half of said overall sequencing batch reaction treatment cycle time, wherein the surface loading rate of the anaerobic zone is from about 100 to 1000 gallons/ft$^2$/day (4 to 40 M$^3$/M$^2$/day), wherein the organic loading rate of the anaerobic zone is from about 60 to about 300 pounds/1000 ft$^3$/day (1 to 5 kg/M$^3$/day), and wherein the amount of organic sludge produced is less than about 0.2 grams of organic sludge per gram of influent BOD5.

3. A method in accordance with claim 1 utilizing a repetitive sequence of the following steps:

a fill step in which the influent waste water is introduced into the anoxic waste liquid treatment zone and pumped from the anoxic waste liquid treatment zone into at least one aerobic sequencing batch waste treatment zone until a predetermined upper liquid level is reached in the aerobic sequencing batch waste treatment zone;

an interaction step in which the waste liquid is aerated in the aerobic sequencing batch waste treatment zone while aerated liquid from the aerobic treatment zone containing nitrate or nitrite components is introduced into the anoxic zone, and anoxic waste liquid from the anoxic zone is introduced into the aerobic zone;

a settling step in which influent wastewater is introduced into the anoxic treatment zone while the waste liquid in the aerobic zone is maintained in a quiescent condition without substantial mixing, aeration or introduction of wastewater from the anoxic zone, to provide an upper zone of clarified wastewater, and a decantation step in which clarified effluent is periodically withdrawn from the clarified upper zone of the aerobic treatment zone.

4. A method in accordance with claim 3, in which the fill step is carried out for about 0.1 to about 2 hours, the interaction step is carried out for about 0.1 to about 2 hours, the settling step is carried out for about 0.5 to about 1 hour, and the decantation step is carried out for about 0.1 to about 2 hours, and the total treatment cycle is carried out for about 1 to about 12 hours.

5. A method in accordance with claim 3 further including an aeration reaction step after the interaction step and before the settling step, in which the influent wastewater is introduced into the anoxic mixing zone, and die aerobic waste liquid treatment zone is mixed and aerated without introduction of wastewater from the anoxic mix zone into the aerobic treatment zone.

6. A method in accordance with claim 1 in which there are two aerobic sequencing waste liquid treatment zones, and wherein the introduction of wastewater and treatment microorganisms from the anoxic waste liquid treatment zone to a respective one of the aerobic sequencing waste liquid treatment zones and the introduction of mixing of waste liquid and treatment microorganisms from that one of the aerobic treatment zones into the anoxic waste liquid treatment zone is carried out at least in part while the other respective aerobic sequencing waste treatment zone is being maintained in a quiescent state or while a portion of the clarified upper layer of the other respective aerated sequencing waste liquid treatment zone is being removed.

7. A method in accordance with claim 1 wherein said step of mixing and aerating the waste liquid in the one or more aerobic sequencing waste liquid treatment zones, said step of introducing waste liquid and treatment microorganisms from the anoxic waste liquid treatment zone into the one or more aerobic sequencing waste liquid treatment zone, and the step of introducing and mixing waste liquid and treatment microorganisms from the one or more aerobic sequencing waste liquid treatment zones are carried out by pumping waste liquid and microorganisms from the anoxic waste liquid treatment zone into the one or more aerobic sequencing waste liquid treatment zones to serve as an aeration motive stream in the one more aerobic waste liquid treatment zones and so that the waste liquid in the one or more waste liquid treatment zones overflows back into the anoxic waste liquid treatment zone during the interaction portion or portions of the sequential treatment cycle.

8. A method in accordance with claim 1 wherein aerated liquid from the surface of the aerobic zone is introduced into the anoxic zone to return scum, foam or other floating material to the anoxic zone, and wherein liquid from the anoxic zone is introduced into the lower portion of the aerobic zone in a diffused flow manner to limit mixing in the zone.

9. A method in accordance with claim 1 wherein the influent wastewater to be treated is substantially continuously introduced into the anoxic waste liquid treatment zone, and wherein the ratio of the volume of the anoxic waste liquid treatment zone to the volume of the one or more aerobic sequencing batch treatment zones is in the range of from about 0.3:1 to about 0.7:1.

10. A method in accordance with claim 1 wherein the introduction of wastewater and treatment microorganisms from the anoxic waste liquid treatment zone to the aerobic sequencing batch treatment zone, and the introduction of wastewater and treatment microorganisms from the sequencing batch aeration zone to the anoxic mix treatment zone are each carried out at a rate of at least about 50 percent of the total volume of the respective aerated treatment zone per hour.

11. A multi-chamber sequencing batch reactor for wastewater treatment comprising:
an anoxic surge reaction tank,
an anoxic surge reaction tank inlet for introducing wastewater to be treated into the anoxic surge reaction tank;
an aerobic reaction tank for periodically mixing and aerating wastewater and wastewater treatment microorganisms and for periodically quiescently settling the solids and microbial content of wastewater in the tank;
a pump for periodically transferring wastewater and treatment microorganisms from the anoxic surge reaction tank to the aeration reaction tank having a pumping capacity of at least about 0.1 times the anoxic mix tank volume per hour;
motive jet aerator disposed in said aeration tank for periodically mixing and aerating wastewater in the aerobic reaction tank,
a decanter for withdrawing liquid from the top of the aerobic reaction tank; and
a passive overflow weir for wastewater surface skimming between the anoxic surge reaction tank and the aerobic reaction tank at a predetermined top liquid level comprising an open-topped interior baffle communicating with a fluid conduit at its bottom, closed end, and a surrounding open-topped shroud which is open at its bottom end for introducing wastewater from the aerobic reaction tank to the anoxic surge reaction tank.

12. A sludge reduction system for biooxidation of wastewater sludge comprising:
a waste sludge or mixed liquor source comprising a biotreatment plant or waste sludge holding tank, and
a sludge reduction treatment system for receiving waste sludge or mixed liquor from said waste sludge or mixed liquor source, comprising an anaerobic treatment tank, an anoxic treatment tank, one or more aeration treatment tanks, and one or more circulation pumps for circulating fluid from the anaerobic tank to the anoxic treatment tank, from the anoxic tank to the aeration tank and from the anoxic tank and/or the aeration tank to the anaerobic tank, wherein the volume of the anaerobic tank comprises from about 20 to about 60 percent the volume of the anoxic tank comprises from about 10 to about 40 percent, and the volume of the one or more aerobic tanks comprise from about 20 to about 60 percent of the total processing volume of the anaerobic, anoxic and aerobic tanks, and a discharge outlet to discharge water to a primary wastewater treatment system.

13. A sludge reduction system in accordance with claim 12 further comprising a filter screen and/or grit separator for filtering waste liquor from the waste sludge or mixed liquor source or the bottom of the anaerobic treatment tank to remove relatively heavy inorganic solids, and wherein said one or more circulation pumps are adapted to provide a recycle flow rate of the waste liquor pumped from the aerobic tank or the anoxic tank to the anaerobic tank of from about 0.5 to about 5 times the influent flow of waste sludge or mixed liquor.

* * * * *